(12) United States Patent
Nakatani et al.

(10) Patent No.: US 12,448,927 B2
(45) Date of Patent: Oct. 21, 2025

(54) ENGINE SYSTEM

(71) Applicant: KABUSHIKI KAISHA TOYOTA JIDOSHOKKI, Kariya (JP)

(72) Inventors: Norinosuke Nakatani, Kariya (JP); Yoshitaka Takeuchi, Kariya (JP); Takayuki Homma, Kariya (JP); Shohei Matsumoto, Kariya (JP); Hideaki Suzuki, Kariya (JP); Hidehito Kubo, Kariya (JP); Hiroyasu Kawauchi, Kariya (JP); Makoto Koike, Nagakute (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 0 days.

(21) Appl. No.: 18/724,496

(22) PCT Filed: Oct. 31, 2022

(86) PCT No.: PCT/JP2022/040805
§ 371 (c)(1),
(2) Date: Jun. 26, 2024

(87) PCT Pub. No.: WO2023/127299
PCT Pub. Date: Jul. 6, 2023

(65) Prior Publication Data
US 2025/0067225 A1 Feb. 27, 2025

(30) Foreign Application Priority Data
Dec. 27, 2021 (JP) .................. 2021-212080

(51) Int. Cl.
*F02D 19/02* (2006.01)
*F02D 41/00* (2006.01)
(Continued)

(52) U.S. Cl.
CPC ......... *F02D 19/025* (2013.01); *F02D 19/029* (2013.01); *F02D 41/0002* (2013.01);
(Continued)

(58) Field of Classification Search
CPC ............. F02D 41/1461; F02D 41/1454; F02D 41/0002; F02D 19/029; F02D 19/025; F02M 21/0227
See application file for complete search history.

(56) References Cited

U.S. PATENT DOCUMENTS 9,249,720 B2   2/2016 Miyagawa
2004/0205998 A1  10/2004 Wakao et al.
(Continued)

FOREIGN PATENT DOCUMENTS

JP   2004-315320 A   11/2004
JP   2005-69180 A    3/2005
(Continued)

OTHER PUBLICATIONS

International Search Report for International Application No. PCT/JP2022/040805 dated Jan. 10, 2023.
(Continued)

*Primary Examiner* — Kevin A Lathers
(74) *Attorney, Agent, or Firm* — Sughrue Mion, PLLC

(57) ABSTRACT

An engine system includes: a reformer including a catalyst for decomposing fuel into hydrogen and configured to reform the fuel to generate a reformed gas containing the hydrogen; a temperature detection unit configured to detect a temperature of the reformed gas; a rotation fluctuation detection unit configured to detect an amount of rotation fluctuation of an engine; and a deterioration detection unit configured to detect whether reforming performance of the catalyst of the reformer is deteriorated based on detection values of the temperature detection unit and the rotation
(Continued)

fluctuation detection unit, wherein when, in an idling period of the engine, the amount of rotation fluctuation of the engine is equal to or greater than a second threshold in a state where the temperature of the reformed gas is equal to or higher than a first threshold, the deterioration detection unit determines that the reforming performance of the catalyst is deteriorated.

9 Claims, 14 Drawing Sheets

(51) Int. Cl.
    *F02D 41/14*     (2006.01)
    *F02M 21/02*     (2006.01)

(52) U.S. Cl.
    CPC ..... *F02D 41/1454* (2013.01); *F02D 41/1461* (2013.01); *F02M 21/0206* (2013.01); *F02M 21/0227* (2013.01); *F02D 2200/0606* (2013.01); *F02D 2200/101* (2013.01)

(56) References Cited

U.S. PATENT DOCUMENTS

| | | | |
|---|---|---|---|
| 2005/0045118 A1* | 3/2005 | Wakao | F02M 27/02 123/3 |
| 2012/0291424 A1* | 11/2012 | Inuzuka | F02D 19/0671 60/299 |
| 2012/0312255 A1 | 12/2012 | Leone | |
| 2020/0195427 A1 | 6/2020 | Beck et al. | |

FOREIGN PATENT DOCUMENTS

| | | | |
|---|---|---|---|
| JP | 2014-211155 A | | 11/2014 |
| JP | 2019-203487 A | | 11/2019 |
| JP | 2021-38121 A | | 3/2021 |
| JP | 2021038121 A | * | 3/2021 |

OTHER PUBLICATIONS

International Preliminary Report on Patentability dated Jun. 20, 2024 with a Translation of the Written Opinion of the International Searching Authority in Application No. PCT/JP2022/040805.

* cited by examiner

ENGINE SYSTEM

This is a National Stage Application of International Application No. PCT/JP2022/040805 filed Oct. 31, 2022, claiming priority based on Japanese Patent Application No. 2021-212080 filed Dec. 27, 2021.

TECHNICAL FIELD

The present disclosure relates to an engine system.

BACKGROUND ART

As a conventional engine system, for example, a technology described in Patent Literature 1 is known. An engine system described in Patent Literature 1 includes: an engine main body; an intake branch pipe connected to an intake port of each cylinder of the engine main body; an ammonia injection valve that injects ammonia toward each engine intake passage of the engine main body; a hydrogen generation device that generates hydrogen from liquid ammonia; and a hydrogen injection valve that injects hydrogen toward each engine intake passage of the engine main body. The hydrogen generation device includes: a tank in which liquid ammonia is stored; a vaporizer that heats and vaporizes liquid ammonia; a supply pipe through which part of gas ammonia generated by the vaporizer flows toward the ammonia injection valve; a decomposer that decomposes gas ammonia generated by the vaporizer; an inflow pipe through which air supplied to the decomposer flows; a supply pipe through which hydrogen generated by the decomposer flows toward the hydrogen injection valve; and an electric heater that heats a catalyst of the decomposer.

Further, Patent Literature 2 describes a hydrogen utilization system. The hydrogen utilization system includes: a reformer that reforms ammonia gas to generate a reformed gas containing hydrogen; a reformed gas flow path through which the reformed gas generated by the reformer flows; a temperature sensor that detects the temperature of the reformed gas flowing through the reformed gas flow path; and a deterioration detection unit that uses the detection value of the temperature sensor to detect deterioration of the reformer. The reformer includes a combustion catalyst for combusting ammonia and a reforming catalyst for decomposing ammonia into hydrogen.

CITATION LIST

Patent Literature

Patent Literature 1: Japanese Unexamined Patent Publication No. 2014-211155
Patent Literature 2: Japanese Unexamined Patent Publication No. 2021-38121

SUMMARY OF INVENTION

Technical Problem

The reforming performance of a reforming catalyst used for a reformer is reduced due to thermal deterioration or the like. When, for example, the engine is constantly operated under the same conditions during its idling, if the reforming performance of the reforming catalyst is reduced, the amount of hydrogen generated by the reformer decreases, and accordingly the ratio of hydrogen supplied to the engine and the total amount of gas (the total amount of ammonia and hydrogen) decrease. Hence, the rotation of the engine may become unstable due to misfire, or the exhaust characteristics of the engine may change. Thus, the reforming catalyst needs to be replaced depending on the condition of deterioration in reforming performance of the reforming catalyst. In Patent Literature 2 above, the temperature of the reformed gas is used to detect deterioration of the reformer. However, even though the temperature of the reformed gas is high, it is uncertain whether or not the reforming performance of the reforming catalyst is so deteriorated that the reforming catalyst needs to be replaced.

An object of the present disclosure is to provide an engine system in which whether the reforming performance of a catalyst of a reformer is deteriorated excessively can be detected with high accuracy.

Solution to Problem

An engine system according to an aspect of the present disclosure includes: an engine in which fuel combusts together with hydrogen; an intake passage through which air supplied to the engine flows; an exhaust passage through which exhaust gas generated in the engine flows; a first flow rate control valve provided on the intake passage and configured to control a flow rate of air supplied to the engine; a first fuel supply valve configured to supply fuel to the engine; a reformer including a catalyst for decomposing fuel into hydrogen and configured to reform fuel to generate a reformed gas containing hydrogen; an air flow path through which air supplied to the reformer flows; a second flow rate control valve provided on the air flow path and configured to control a flow rate of air supplied to the reformer; a second fuel supply valve configured to supply fuel to the reformer; a reformed gas flow path through which the reformed gas generated by the reformer flows toward the engine; a temperature detection unit configured to detect the temperature of the reformed gas flowing through the reformed gas flow path; a rotation fluctuation detection unit configured to detect an amount of rotation fluctuation of the engine; and a deterioration detection unit configured to detect whether reforming performance of the catalyst of the reformer is deteriorated or not based on the detection values of the temperature detection unit and the rotation fluctuation detection unit; in the engine system, when, in an idling period of the engine, the amount of rotation fluctuation of the engine is equal to or greater than a second threshold in a state where the temperature of the reformed gas is equal to or higher than a first threshold, the deterioration detection unit determines that the reforming performance of the catalyst is deteriorated.

In such an engine system, when fuel and air are supplied to the reformer, the fuel is reformed by the catalyst of the reformer and thereby a reformed gas containing hydrogen is generated, and the reformed gas flows through the reformed gas flow path and is supplied to the engine. Then, fuel and air are supplied to the engine, and thereby the fuel is mixed with hydrogen and combusted in the engine. Here, if the reforming performance of the catalyst is deteriorated, the temperature of the reformed gas is increased as compared to that in the normal condition. Further, if the reforming performance of the catalyst is deteriorated, the combustion of fuel in the engine is unstable, and therefore the amount of rotation fluctuation of the engine is increased as compared to that in the normal condition. Thus, the temperature of the reformed gas and the amount of rotation fluctuation of the engine are detected, and whether the reforming performance of the catalyst is deteriorated or not is detected based on the temperature of the reformed gas and the amount of rotation fluctuation of the engine. Specifically, when, in the idling period of the engine, the amount of rotation fluctuation of the engine is equal to or greater than a second threshold in a state where the temperature of the reformed gas is equal to or higher than a first threshold, it is determined that the reforming performance of the catalyst is deteriorated. Thus, whether the reforming performance of the catalyst is deteriorated excessively is detected with high accuracy by using not only the temperature of the reformed gas but also the amount of rotation fluctuation of the engine, for the detection of deterioration in reforming performance of the catalyst.

The deterioration detection unit may determine that the reforming performance of the catalyst is deteriorated when, in a first idling period during starting of the engine, the amount of rotation fluctuation of the engine is equal to or greater than the second threshold in a state where the temperature of the reformed gas is equal to or higher than the first threshold.

In the first idling period during the starting of the engine, fuel and air are supplied to the reformer under the same stable conditions. Therefore, whether the reforming performance of the catalyst is deteriorated excessively is detected with higher accuracy.

The engine system may further include an oxygen detection unit configured to detect a concentration of residual oxygen contained in the reformed gas flowing through the reformed gas flow path; the deterioration detection unit may determine that the reforming performance of the catalyst is deteriorated when, in an idling period of the engine, the amount of rotation fluctuation of the engine is equal to or greater than the second threshold in a state where the temperature of the reformed gas is equal to or higher than the first threshold and the concentration of residual oxygen contained in the reformed gas is equal to or higher than a third threshold.

If the reforming performance of the catalyst of the reformer deteriorates, the amount of hydrogen generated by the reformer decreases, and accordingly the concentration of residual oxygen contained in the reformed gas becomes higher than in the normal condition. Thus, whether the reforming performance of the catalyst is deteriorated excessively is detected with still higher accuracy by using the concentration of residual oxygen contained in the reformed gas in addition to the temperature of the reformed gas and the amount of rotation fluctuation of the engine, for the detection of deterioration in reforming performance of the catalyst.

The engine system may further include a hydrogen detection unit configured to detect a concentration of hydrogen contained in the reformed gas flowing through the reformed gas flow path; the deterioration detection unit may determine that the reforming performance of the catalyst is deteriorated when, in an idling period of the engine, the amount of rotation fluctuation of the engine is equal to or greater than the second threshold in a state where the temperature of the reformed gas is equal to or higher than the first threshold and the concentration of hydrogen contained in the reformed gas is equal to or lower than a fourth threshold.

If the reforming performance of the catalyst of the reformer deteriorates, the amount of hydrogen generated by the reformer decreases, and accordingly the concentration of hydrogen contained in the reformed gas becomes lower than in the normal condition. Thus, whether the reforming performance of the catalyst is deteriorated excessively is detected with still higher accuracy by using the concentration of hydrogen contained in the reformed gas in addition to the temperature of the reformed gas and the amount of rotation fluctuation of the engine, for the detection of deterioration in reforming performance of the catalyst.

The engine system may further include a pressure detection unit configured to detect a pressure in the reformed gas flow path; the deterioration detection unit may determine that the reforming performance of the catalyst is deteriorated when, in an idling period of the engine, the amount of rotation fluctuation of the engine is equal to or greater than the second threshold in a state where the temperature of the reformed gas is equal to or higher than the first threshold and the pressure in the reformed gas flow path is equal to or lower than a fifth threshold.

If the reforming performance of the catalyst of the reformer deteriorates, the amount of hydrogen generated by the reformer decreases, and accordingly the total flow rate of the reformed gas flowing through the reformed gas flow path decreases. Accordingly, the pressure in the reformed gas flow path becomes lower than in the normal condition. Thus, whether the reforming performance of the catalyst is deteriorated excessively is detected with still higher accuracy by using the pressure in the reformed gas flow path in addition to the temperature of the reformed gas and the amount of rotation fluctuation of the engine, for the detection of deterioration in reforming performance of the catalyst.

The engine system may further include a pressure detection unit configured to detect a pressure in the intake passage; the deterioration detection unit may determine that the reforming performance of the catalyst is deteriorated when, in an idling period of the engine, the amount of rotation fluctuation of the engine is equal to or greater than the second threshold in a state where the temperature of the reformed gas is equal to or higher than the first threshold and the pressure in the intake passage is equal to or lower than a sixth threshold.

If the reforming performance of the catalyst of the reformer deteriorates, the amount of hydrogen generated by the reformer decreases, and accordingly the total flow rate of the reformed gas flowing through the reformed gas flow path decreases. Accordingly, the pressure in the intake passage becomes lower than in the normal condition. Thus, whether the reforming performance of the catalyst is deteriorated excessively is detected with still higher accuracy by using the pressure in the intake passage in addition to the temperature of the reformed gas and the amount of rotation fluctuation of the engine, for the detection of deterioration in reforming performance of the catalyst.

The engine system may further include a nitrogen oxide detection unit configured to detect a concentration of nitrogen oxides contained in the exhaust gas flowing through the exhaust passage; the deterioration detection unit may determine that the reforming performance of the catalyst is deteriorated when, in an idling period of the engine, the amount of rotation fluctuation of the engine is equal to or greater than the second threshold in a state where the temperature of the reformed gas is equal to or higher than the first threshold and the concentration of nitrogen oxides is equal to or lower than a seventh threshold.

When the concentration of oxygen contained in the exhaust gas is the same, the concentration of NOx contained in the exhaust gas decreases as the ratio of hydrogen supplied to the engine decreases. If the reforming performance of the catalyst of the reformer deteriorates, the amount of hydrogen generated by the reformer decreases, and accordingly the ratio of hydrogen supplied to the engine decreases. Accordingly, the concentration of nitrogen oxides contained in the exhaust gas becomes lower than in the normal condition. Thus, whether the reforming performance of the catalyst is deteriorated excessively is detected with still higher accuracy by using the concentration of nitrogen oxides contained in the exhaust gas in addition to the temperature of the reformed gas and the amount of rotation fluctuation of the engine, for the detection of deterioration in reforming performance of the catalyst.

The engine system may further include a control unit configured to, when it is determined by the deterioration detection unit that the reforming performance of the catalyst is deteriorated, control the second flow rate control valve so that a flow rate of air supplied to the reformer increases.

If the reforming performance of the catalyst of the reformer deteriorates, the amount of hydrogen generated by the reformer decreases, and accordingly the total flow rate of the reformed gas supplied to the engine decreases. Thus, when the reforming performance of the catalyst is deteriorated, the total flow rate of the reformed gas supplied to the engine is secured by increasing the flow rate of air supplied to the reformer.

The engine system may further include an in-exhaust oxygen detection unit configured to detect a concentration of oxygen contained in the exhaust gas flowing through the exhaust passage; the control unit may determine whether or not the concentration of oxygen detected by the in-exhaust oxygen detection unit is equal to or lower than a target value, and may, when the concentration of oxygen is higher than the target value, control the second fuel supply valve so that a flow rate of fuel supplied to the reformer increases.

In such a configuration, when the concentration of oxygen contained in the exhaust gas is higher than the target value, the flow rate of fuel supplied to the reformer increases, and accordingly the flow rate of unburned fuel contained in the reformed gas supplied to the engine increases. Therefore, even if the flow rate of air supplied to the engine increases due to an increase in the flow rate of air supplied to the reformer, the necessary air-fuel ratio is maintained in the engine.

Advantageous Effects of Invention

According to the present disclosure, whether the reforming performance of a catalyst of a reformer is deteriorated excessively can be detected with high accuracy.

DESCRIPTION OF EMBODIMENTS

Figure 1:
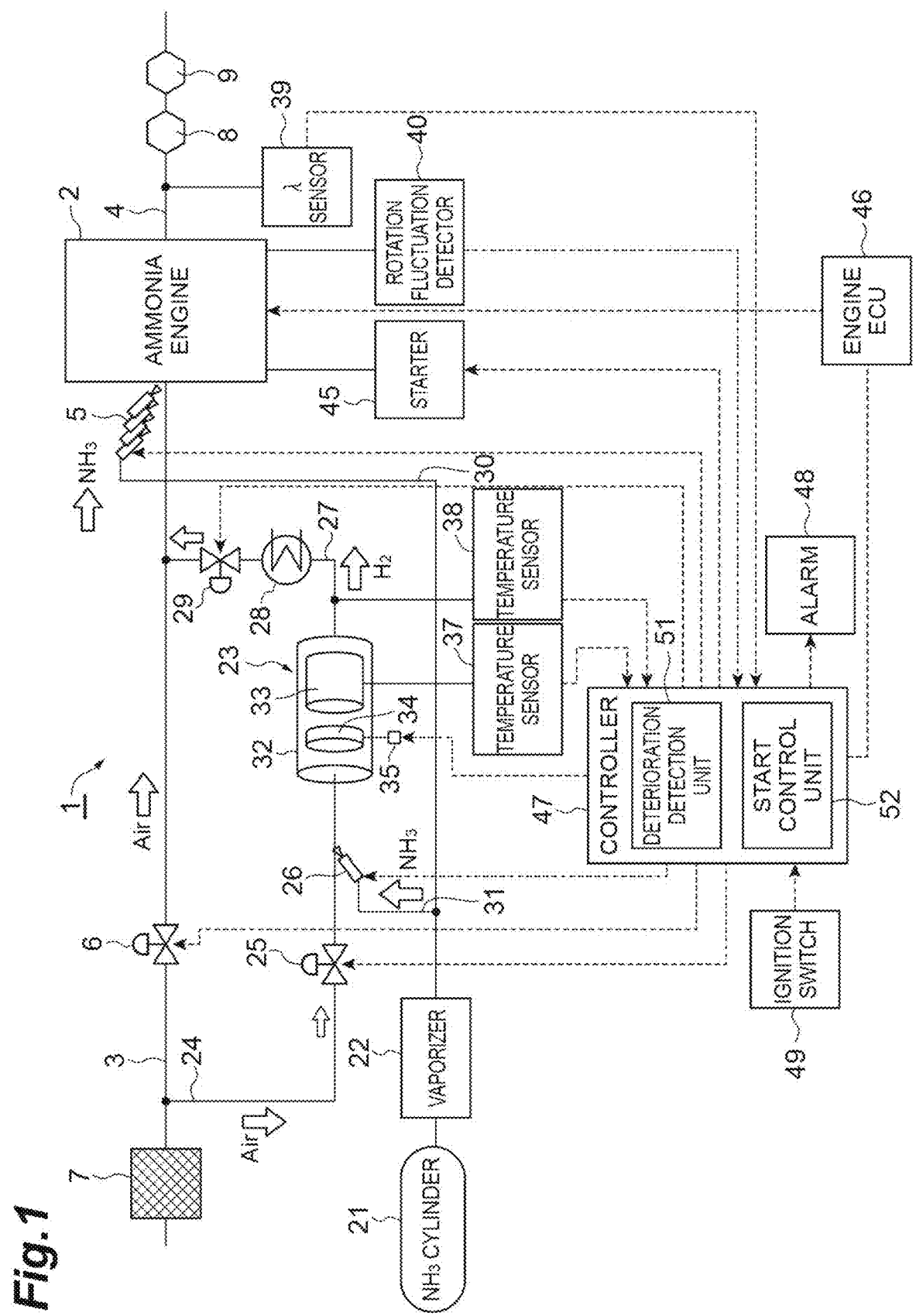
FIG. 1 is a schematic configuration diagram showing an engine system according to a first embodiment of the present disclosure.

Hereinbelow, embodiments of the present disclosure are described in detail with reference to the drawings. In the drawings, the same or equivalent elements are marked with the same reference numerals, and a repeated description is omitted.

FIG. 1 is a schematic configuration diagram showing an engine system according to a first embodiment of the present disclosure. In FIG. 1, an engine system 1 of the present embodiment is mounted on a vehicle (not illustrated). The engine system 1 includes an ammonia engine 2, an intake passage 3, an exhaust passage 4, a main injector 5, and a main throttle valve 6.

The ammonia engine 2 is an engine that uses ammonia gas ($NH_3$ gas) as fuel. In the ammonia engine 2, hydrogen ($H_2$) as a combustion aid is mixed with ammonia gas in order to easily combust flame-retardant ammonia gas. Herein, the ammonia engine 2 is a four-cylinder engine.

Figure 2:
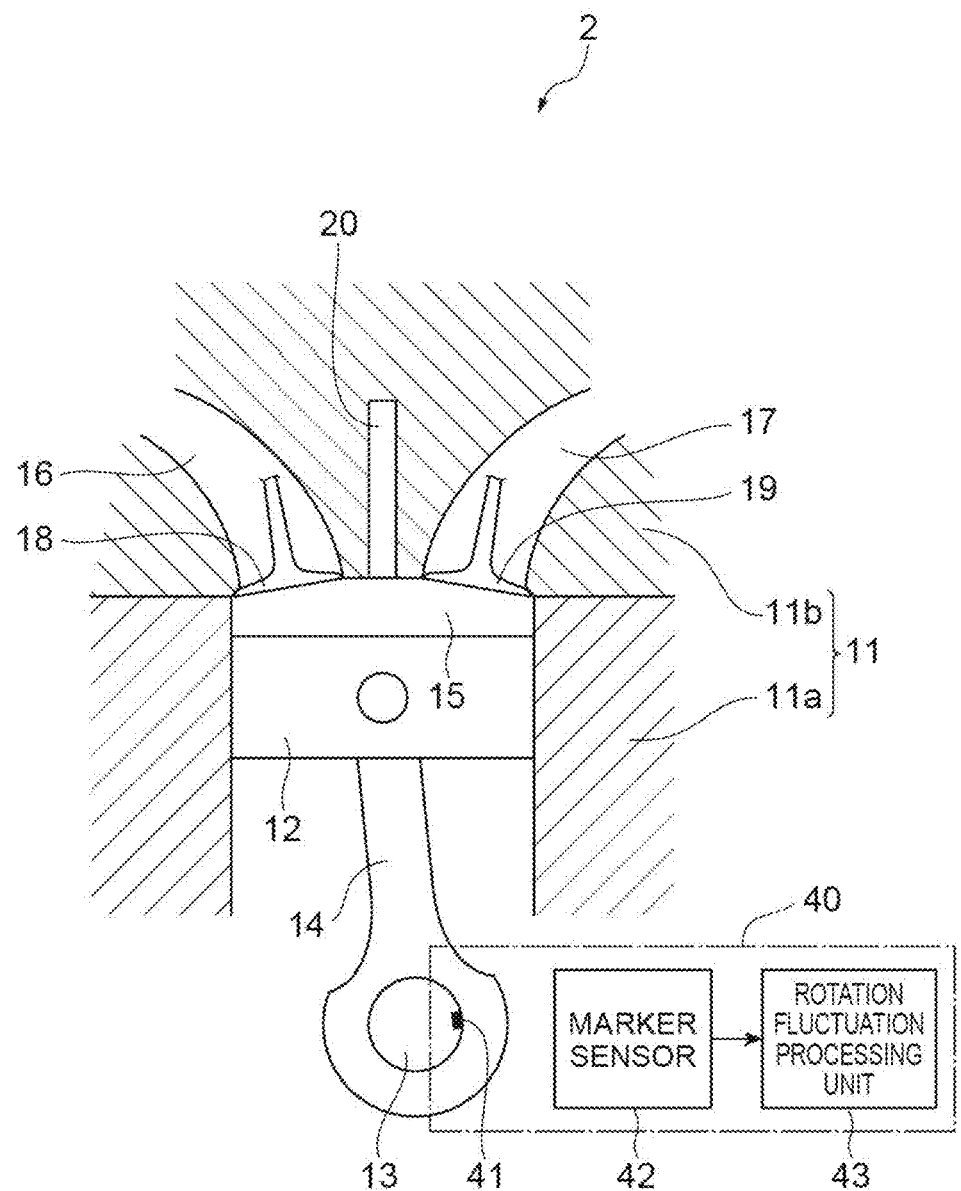
FIG. 2 is a diagram showing a configuration of a rotation fluctuation detector shown in FIG. 1, together with a cross-sectional view of an ammonia engine.

As shown in FIG. 2, the ammonia engine 2 includes a cylinder 11, a piston 12 placed in the cylinder 11 in a reciprocally movable manner, and a connecting rod 14 connecting the piston 12 and a crankshaft 13.

The cylinder 11 is composed of a cylinder block 11a and a cylinder head 11b placed above the cylinder block 11a. The space defined by the cylinder block 11a, the cylinder head 11b, and the piston 12 forms a combustion chamber 15 in which ammonia gas combusts together with hydrogen to generate exhaust gas.

The cylinder head 11b is provided with an intake port 16 and an exhaust port 17 communicating with the combustion chamber 15. The intake port 16 is opened and closed by an intake valve 18. The exhaust port 17 is opened and closed by an exhaust valve 19. An ignition plug 20 is attached to the cylinder head 11b. The ignition plug 20 ignites a mixed gas of ammonia gas and air to ignite the ammonia gas.

The intake passage 3 is connected to the intake port 16 of the ammonia engine 2. The intake passage 3 is a passage through which air supplied to the combustion chamber 15 of the ammonia engine 2 flows. An air cleaner 7 that removes foreign matters such as dust and dirt contained in air is provided on the intake passage 3.

The exhaust passage 4 is connected to the exhaust port 17 of the ammonia engine 2. The exhaust passage 4 is a passage through which exhaust gas generated in the combustion chamber 15 of the ammonia engine 2 flows. A three-way catalyst 8 capable of purifying carbon monoxide (CO), hydrocarbons (HC), and nitrogen oxides (NOx) and an SCR catalyst 9 for removing NOx contained in exhaust gas are provided on the exhaust passage 4. In the engine system 1, in which ammonia gas is used as fuel, the three-way catalyst 8 can purify unburned ammonia contained in exhaust gas.

The main injector 5 is an electromagnetic fuel injection valve that injects ammonia gas toward the combustion chamber 15 of the ammonia engine 2. The main injector 5 forms a first fuel supply valve that supplies ammonia gas to the ammonia engine 2.

The main throttle valve 6 is provided on the intake passage 3. The main throttle valve 6 is a first flow rate control valve that electromagnetically controls the flow rate of air supplied to the ammonia engine 2.

The engine system 1 further includes an ammonia cylinder 21, a vaporizer 22, a reformer 23, an air flow path 24, a reforming throttle valve 25, a reforming injector 26, a reformed gas flow path 27, a cooler 28, and a flow rate regulating valve 29.

The ammonia cylinder 21 is a container that stores ammonia in a liquid state. That is, the ammonia cylinder 21 stores liquid ammonia.

The vaporizer 22 vaporizes liquid ammonia stored in the ammonia cylinder 21 to generate ammonia gas. The ammonia gas generated by the vaporizer 22 flows through an ammonia flow path 30 and is supplied to the main injector 5, and furthermore flows through an ammonia flow path 31 and is supplied to the reforming injector 26.

The reformer 23 reforms ammonia gas by using heat generated by combusting ammonia gas, and thereby generates a reformed gas containing hydrogen. The reformer 23 includes a cylindrical housing 32, and a reforming catalyst 33 and an electric heater 34 housed in the housing 32. The housing 32 is formed of a metal material such as stainless steel having corrosion resistance to ammonia gas.

The reforming catalyst 33 has, for example, a honeycomb structure. The reforming catalyst 33 is a catalyst for combusting ammonia gas and decomposing ammonia gas into hydrogen. The reforming catalyst 33 is, for example, an ATR (autothermal reformer) type ammonia reforming catalyst. As the reforming catalyst 33, for example, a cobalt-based catalyst, a rhodium-based catalyst, a ruthenium-based catalyst, a palladium-based catalyst, or the like is used.

The electric heater 34 is placed in a portion of the interior of the housing 32 on the upstream side of the reforming catalyst 33. The electric heater 34 generates heat when energized by a power source 35, and heats the reforming catalyst 33 with the heat. Specifically, heat generated by the electric heater 34 is transferred to the reforming catalyst 33 through the housing 32 itself, and is also transferred to the reforming catalyst 33 through ammonia gas and air flowing in the housing 32.

The air flow path 24 connects the intake passage 3 and the reformer 23. One end of the air flow path 24 is connected to a portion of the intake passage 3 between the air cleaner 7 and the main throttle valve 6. The other end of the air flow path 24 is connected to an inlet of the housing 32 of the reformer 23. The air flow path 24 is a flow path through which air supplied to the reformer 23 flows.

The reforming throttle valve 25 is provided on the air flow path 24. The reforming throttle valve 25 is a second flow rate control valve that electromagnetically controls the flow rate of air supplied to the reformer 23.

The reforming injector 26 is an electromagnetic fuel injection valve that injects ammonia gas to the air flow path 24. The reforming injector 26 injects ammonia gas to a portion of the air flow path 24 between the reforming throttle valve 25 and the reformer 23. The reforming injector 26 forms a second fuel supply valve that supplies ammonia gas to the reformer 23.

The reformed gas flow path 27 connects the reformer 23 and the intake passage 3. One end of the reformed gas flow path 27 is connected to an outlet of the housing 32 of the reformer 23. The other end of the reformed gas flow path 27 is connected to a portion of the intake passage 3 between the main throttle valve 6 and the ammonia engine 2. The reformed gas flow path 27 is a flow path through which the reformed gas generated by the reformer 23 flows toward the ammonia engine 2.

The cooler 28 is provided on the reformed gas flow path 27. The cooler 28 cools the reformed gas flowing through the reformed gas flow path 27 by using, for example, engine cooling water for cooling the ammonia engine 2.

The flow rate regulating valve 29 is provided on a portion of the reformed gas flow path 27 on the downstream side of the cooler 28. The flow rate regulating valve 29 is an electromagnetic valve that regulates the flow rate of the reformed gas supplied to the ammonia engine 2. An electromagnetic opening/closing valve (ON/OFF valve) may be used in place of the flow rate regulating valve 29.

The engine system 1 further includes temperature sensors 37 and 38, a λ sensor 39, and a rotation fluctuation detector 40.

The temperature sensor 37 is a sensor that detects the temperature of the reforming catalyst 33 of the reformer 23. The temperature sensor 38 is a sensor (temperature detection unit) that detects the temperature of the reformed gas flowing through the reformed gas flow path 27. The λ sensor 39 is a sensor (in-exhaust oxygen detection unit) that detects the concentration of oxygen ($O_2$) contained in the exhaust gas flowing through the exhaust passage 4.

The rotation fluctuation detector 40 is a rotation fluctuation detection unit that detects the amount of rotation fluctuation of the ammonia engine 2. As shown in FIG. 2, the rotation fluctuation detector 40 includes a marker 41 provided on the crankshaft 13, a marker sensor 42, and a rotation fluctuation processing unit 43.

The marker 41 is attached to, for example, a portion of a peripheral edge portion of an end surface of the crankshaft 13. The marker sensor 42 detects the marker 41 by, for example, applying light to a predetermined portion of the peripheral edge portion of the end surface of the crankshaft 13.

The rotation fluctuation processing unit 43 is composed of a CPU, a RAM, a ROM, an input/output interface, etc. The rotation fluctuation processing unit 43 detects the amount of rotation fluctuation of the ammonia engine 2 based on a detection signal of the marker sensor 42. Specifically, the rotation fluctuation processing unit 43 measures, as the rotation cycle of the crankshaft 13, the detection cycle of the marker 41 detected by the marker sensor 42. Then, the rotation fluctuation processing unit 43 detects the amount of fluctuation of the rotation cycle of the crankshaft 13, and thereby detects the amount of rotation fluctuation of the ammonia engine 2.

The rotation fluctuation detector 40 is not particularly limited to such a configuration. For example, a marker 41 may be provided in a peripheral edge portion of a shaft unit that is a constituent component of the crankshaft 13. Alternatively, instead of providing the marker 41, part of a toothed wheel of a gear that is a constituent component of the crankshaft 13 may be eliminated, and the cutout portion of the toothed wheel may be detected with a sensor.

The engine system 1 further includes a starter 45, an engine ECU 46, a controller 47, and an alarm 48.

The starter 45 starts the ammonia engine 2. Although not particularly illustrated, the starter 45 includes a motor, a plurality of gears, etc.

The engine ECU 46 is composed of a CPU, a RAM, a ROM, an input/output interface, etc. The engine ECU 46 is an ECU (electronic control unit) that controls the ammonia engine 2.

Specifically, the engine ECU 46 controls the intake valve 18, the exhaust valve 19, and the ignition plug 20 (see FIG. 2) of the ammonia engine 2 so that four strokes of an intake stroke, a compression stroke, an expansion stroke (combustion stroke), and an exhaust stroke constitute one cycle. The engine ECU 46 makes control to open the intake valve 18 in the intake stroke. The engine ECU 46 makes control to ignite the ignition plug 20 in the expansion stroke. The engine ECU 46 makes control to open the exhaust valve 19 in the exhaust stroke.

When an ignition switch 49 is operated to ON, the controller 47 executes predetermined processing based on the detection values of the temperature sensors 37 and 38, the λ sensor 39, the rotation fluctuation detector 40, etc. and thus controls the main injector 5, the main throttle valve 6, the reforming throttle valve 25, the reforming injector 26, the power source 35 of the electric heater 34, the flow rate regulating valve 29, the starter 45, and the alarm 48, and outputs a control start signal to the engine ECU 46.

If the reforming performance of the reforming catalyst 33 of the reformer 23 experiences deterioration or the like, the alarm 48 makes an alarm display or issues an alarm with an alarm sound. The alarm 48 forms a notification unit that notifies the user that the reforming performance of the reforming catalyst 33 is deteriorated.

The controller 47 is composed of a CPU, a RAM, a ROM, an input/output interface, etc. The controller 47 includes a deterioration detection unit 51 and a start control unit 52.

The deterioration detection unit 51 detects whether the reforming performance of the reforming catalyst 33 of the reformer 23 is deteriorated or not based on the detection values of the temperature sensor 38 and the rotation fluctuation detector 40. When, in the first idling period during the starting of the ammonia engine 2, the amount of rotation fluctuation of the ammonia engine 2 is equal to or greater than threshold B in a state where the temperature of the reformed gas is equal to or higher than threshold A, the deterioration detection unit 51 determines that the reforming performance of the reforming catalyst 33 is deteriorated.

The start control unit 52 controls the main injector 5, the main throttle valve 6, the reforming throttle valve 25, the reforming injector 26, the power source 35 of the electric heater 34, the flow rate regulating valve 29, and the starter 45 so that the ammonia engine 2 is started according to the result of detection by the deterioration detection unit 51.

The start control unit 52 forms a control unit that, when it is determined by the deterioration detection unit 51 that the reforming performance of the reforming catalyst 33 is deteriorated, controls the reforming throttle valve 25 so that the flow rate of air supplied to the reformer 23 increases.

Figure 3:
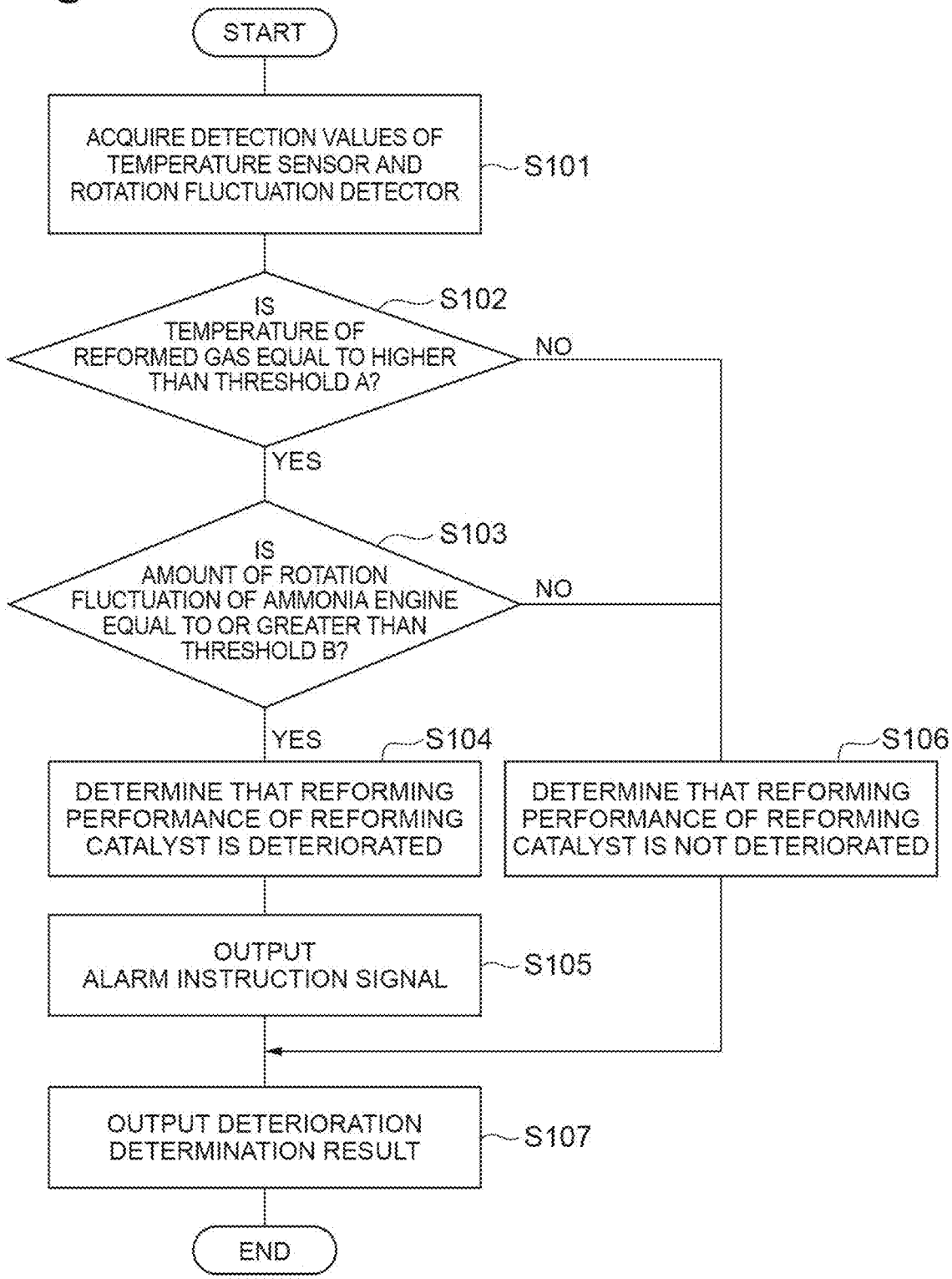
FIG. 3 is a flowchart showing a procedure of deterioration detection processing executed by a deterioration detection unit shown in FIG. 1.

FIG. 3 is a flowchart showing a procedure of deterioration detection processing executed by the deterioration detection unit 51. The present processing is executed when the ignition switch 49 is operated to ON. That is, the present processing is executed in the first idling period during the cold start of the ammonia engine 2.

In FIG. 3, the deterioration detection unit 51 first acquires the detection values of the temperature sensor 38 and the rotation fluctuation detector 40 (step S101). Then, based on the detection value of the temperature sensor 38, the deterioration detection unit 51 determines whether or not the temperature of the reformed gas flowing through the reformed gas flow path 27 is equal to or higher than threshold A (step S102). Threshold A is, for example, the maximum value of the temperature for guaranteeing the reforming performance of the reforming catalyst 33 (a first threshold).

When the deterioration detection unit 51 determines that the temperature of the reformed gas is equal to or higher than threshold A, the deterioration detection unit 51 determines, based on the detection value of the rotation fluctuation detector 40, whether or not the amount of rotation fluctuation of the ammonia engine 2 is equal to or greater than threshold B (step S103). Threshold B is, for example, the minimum value of the amount of rotation fluctuation with which the combustion of ammonia gas is unstable in the ammonia engine 2 (a second threshold).

At this time, the deterioration detection unit 51 may determine whether or not the amount of rotation fluctuation of the ammonia engine 2 is equal to or greater than threshold B when the deterioration detection unit 51 determines that the temperature of the reformed gas is continuously equal to or higher than threshold A for a predetermined period of time. Further, the deterioration detection unit 51 may determine whether or not the amount of rotation fluctuation of the ammonia engine 2 is continuously equal to or greater than threshold B for a predetermined period of time when the deterioration detection unit 51 determines that the temperature of the reformed gas is continuously equal to or higher than threshold A for a predetermined period of time.

When the deterioration detection unit 51 determines that the amount of rotation fluctuation of the ammonia engine 2 is equal to or greater than threshold B, the deterioration detection unit 51 determines that the reforming performance of the reforming catalyst 33 is deteriorated (step S104). Then, the deterioration detection unit 51 outputs an alarm instruction signal to the alarm 48 (step S105). Then, the alarm 48 issues an alarm indicating that the reforming performance of the reforming catalyst 33 is deteriorated.

When the deterioration detection unit 51 determines in step S102 that the temperature of the reformed gas is lower than threshold A or when the deterioration detection unit 51 determines in step S103 that the amount of rotation fluctuation of the ammonia engine 2 is less than threshold B, the deterioration detection unit 51 determines that the reforming performance of the reforming catalyst 33 is not deteriorated (step S106).

After executing step S105 or step S106, the deterioration detection unit 51 outputs the result of determination of deterioration in reforming performance of the reforming catalyst 33 to the start control unit 52 (step S107).

Figure 4:
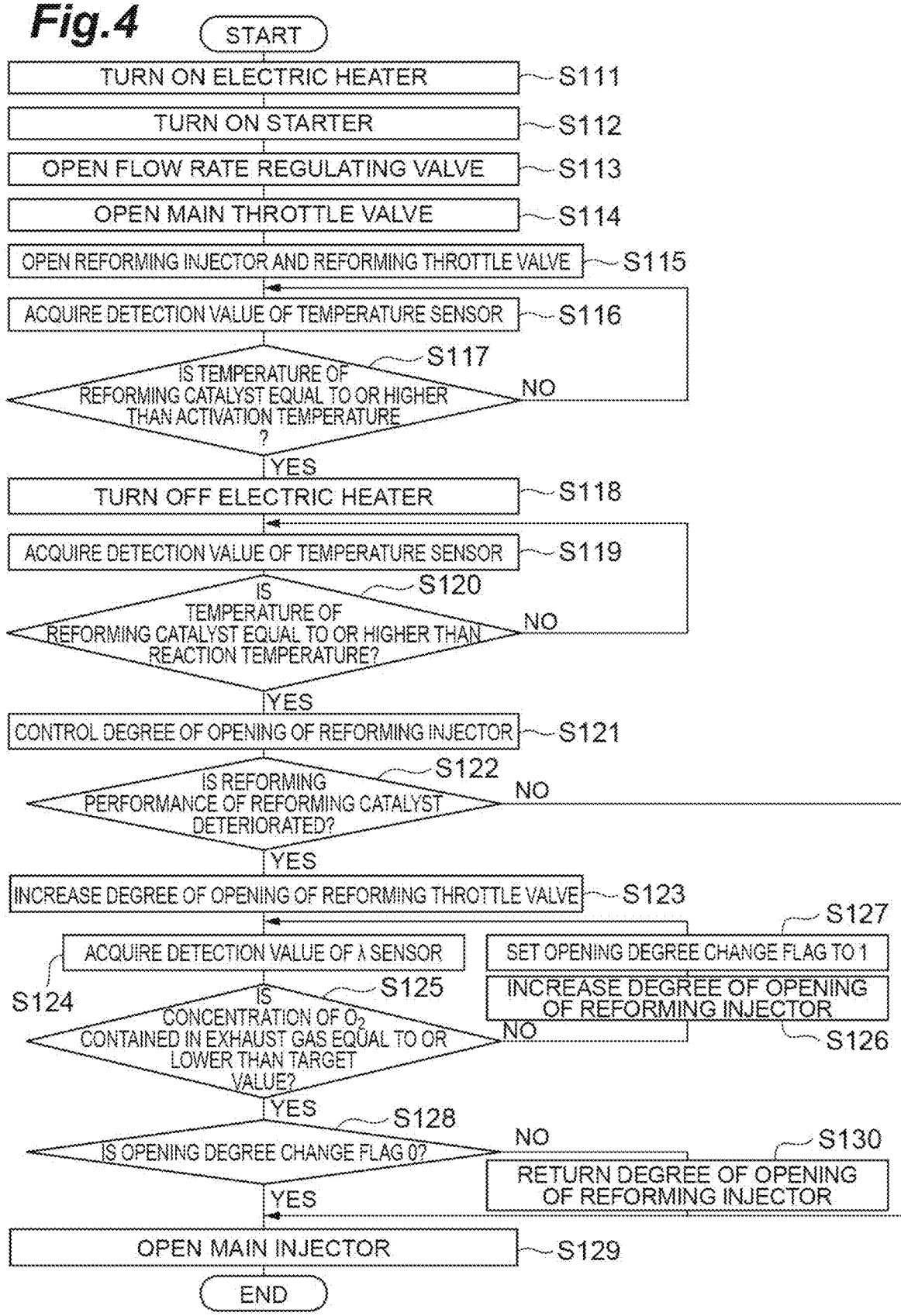
FIG. 4 is a flowchart showing a procedure of start control processing executed by a start control unit shown in FIG. 1.

FIG. 4 is a flowchart showing a procedure of start control processing executed by the start control unit 52. Like in the deterioration detection unit 51, the present processing is executed when the ignition switch 49 is operated to ON.

Before executing the present processing, all of the main injector 5, the main throttle valve 6, the reforming throttle valve 25, the reforming injector 26, and the flow rate regulating valve 29 are in a closed state. Further, an opening degree change flag is set to 0. The opening degree change flag is a flag indicating that the degree of opening of the reforming injector 26 has been changed in order to lower the concentration of oxygen contained in the exhaust gas.

In FIG. 4, the start control unit 52 first performs ON control on the power source 35 of the electric heater 34 (step S111). Further, the start control unit 52 performs ON control on the starter 45 (step S112). Further, the start control unit 52 makes control to open the flow rate regulating valve 29 (step S113).

Subsequently, the start control unit 52 makes control to open the main throttle valve 6 (step S114). Thereby, air is supplied to the ammonia engine 2. Further, the start control unit 52 makes control to open the reforming injector 26 and the reforming throttle valve 25 (step S115). Thereby, ammonia gas and air are supplied to the reformer 23.

Subsequently, the start control unit 52 acquires the detection value of the temperature sensor 37 (step S116). Then, based on the detection value of the temperature sensor 37, the start control unit 52 determines whether or not the temperature of the reforming catalyst 33 is equal to or higher than the activation temperature (step S117). The activation temperature is a temperature at which the reforming catalyst 33 can combust.

When the start control unit 52 determines that the temperature of the reforming catalyst 33 is lower than the activation temperature, the start control unit 52 executes step S116 above again. When the start control unit 52 determines that the temperature of the reforming catalyst 33 is equal to or higher than the activation temperature, the start control unit 52 performs OFF control on the power source 35 of the electric heater 34 (step S118).

Subsequently, the start control unit 52 acquires the detection value of the temperature sensor 37 (step S119). Then, based on the detection value of the temperature sensor 37, the start control unit 52 determines whether or not the temperature of the reforming catalyst 33 is equal to or higher than the reaction temperature (step S120). The reaction temperature is a temperature at which the reforming catalyst 33 can perform reforming. The reaction temperature is higher than the activation temperature. Specifically, the reaction temperature is a temperature at which a desired amount of hydrogen is generated by the reforming catalyst 33 (see FIG. 12).

When the start control unit 52 determines that the temperature of the reforming catalyst 33 is lower than the reaction temperature, the start control unit 52 executes step S119 above again. When the start control unit 52 determines that the temperature of the reforming catalyst 33 is equal to or higher than the reaction temperature, the start control unit 52 controls the degree of opening of the reforming injector 26 (step S121). At this time, the start control unit 52 controls the degree of opening of the reforming injector 26 so that the air-fuel ratio of the reformer 23 becomes an air-fuel ratio suitable for the operation of reforming ammonia gas.

Subsequently, the start control unit 52 determines whether the reforming performance of the reforming catalyst 33 is deteriorated or not based on the result of detection by the deterioration detection unit 51 (step S122). When the start control unit 52 determines that the reforming performance of the reforming catalyst 33 is deteriorated, the start control unit 52 makes control to increase the degree of opening of the reforming throttle valve 25 (step S123). Thereby, the flow rate of air supplied to the reformer 23 is increased.

Subsequently, the start control unit 52 acquires the detection value of the λ sensor 39 (step S124). Then, based on the detection value of the λ sensor 39, the start control unit 52 determines whether or not the concentration of oxygen contained in the exhaust gas flowing through the exhaust passage 4 is equal to or lower than a target value determined in advance (step S125).

When the start control unit 52 determines that the concentration of oxygen contained in the exhaust gas is higher than the target value, the start control unit 52 makes control to increase the degree of opening of the reforming injector 26 (step S126). Thereby, the flow rate of ammonia gas supplied to the reformer 23 is increased. Then, the start control unit 52 sets the opening degree change flag to 1 (step S127), and executes step S124 above again.

When the start control unit 52 determines in step S125 that the concentration of oxygen contained in the exhaust gas is equal to or lower than the target value, the start control unit 52 determines whether or not the opening degree change flag is 0 (step S128). When the start control unit 52 determines that the opening degree change flag is 0, the start control unit 52 makes control to open the main injector 5 (step S129). Thereby, ammonia gas is supplied to the ammonia engine 2. At this time, the start control unit 52 controls the degree of opening of the main injector 5 so that the air-fuel ratio of the ammonia engine 2 becomes an air-fuel ratio suitable for the idling state.

When the start control unit 52 determines that the opening degree change flag is 1, the start control unit 52 makes control to return the degree of opening of the reforming injector 26 to the original degree of opening (the degree of opening set in step S121 above) (step S130). Then, the start control unit 52 makes control to open the main injector 5 (step S129).

When the start control unit 52 determines in step S122 that the reforming performance of the reforming catalyst 33 is not deteriorated, the start control unit 52 makes control to open the main injector 5 without executing steps S123 to S128 above (step S129).

In the engine system 1 described above, when the ignition switch 49 is operated to ON, the electric heater 34 is energized, and the flow rate regulating valve 29 is opened. Further, the starter 45 is driven, and the intake valve 18, the exhaust valve 19, and the ignition plug 20 are controlled by the engine ECU 46; thereby, the start operation of the ammonia engine 2 is started.

Then, the main throttle valve 6 is opened, and thereby air is supplied to the combustion chamber 15 of the ammonia engine 2. Further, the reforming injector 26 and the reforming throttle valve 25 are opened, and thereby ammonia gas and air are supplied to the reformer 23. At this time, the reforming catalyst 33 is heated by the electric heater 34. The ammonia gas and the air supplied to the reformer 23 flow through the reformed gas flow path 27 and the intake passage 3, and are supplied to the combustion chamber 15 of the ammonia engine 2.

Then, when the temperature of the reforming catalyst 33 reaches the activation temperature, ammonia gas is combusted by the reforming catalyst 33. Specifically, as shown in the following formula, ammonia and oxygen in air chemically react with each other (exothermic reaction).

$$NH_3 + 3/4 O_2 \rightarrow 1/2 N_2 + 3/2 H_2O + 242 \text{ KJ/mol}$$

Further, when the temperature of the reforming catalyst 33 reaches the activation temperature, the energization of the electric heater 34 ends, but the temperature of the reforming catalyst 33 is further increased by the combustion heat (self-heat) of ammonia gas. Then, when the temperature of the reforming catalyst 33 reaches the reaction temperature, ammonia gas is reformed by the reforming catalyst 33. Specifically, as shown in the following formula, decomposition reaction of ammonia occurs (endothermic reaction), and a reformed gas containing hydrogen is generated.

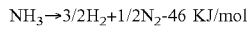

The reformed gas flows through the reformed gas flow path 27 and the intake passage 3, and is supplied to the combustion chamber 15 of the ammonia engine 2. Then, in the combustion chamber 15, hydrogen in the reformed gas and unburned ammonia gas combust.

At the first idling time immediately after the starting of such an ammonia engine 2 has begun, in order to maintain the rotational stability and the exhaust characteristics of the ammonia engine 2, the ammonia engine 2 needs to be operated in a state where the ratio of hydrogen supplied to the ammonia engine 2, the total flow rate of the reformed gas, and the air-fuel ratio are set within specified ranges.

However, the reforming catalyst 33 of the reformer 23 is more likely to deteriorate in reforming performance than in oxidation performance, due to thermal deterioration or the like. If the reforming performance of the reforming catalyst 33 deteriorates, the amount of hydrogen generated by the reformer 23 decreases, and accordingly the ratio of hydrogen supplied to the ammonia engine 2 and the total flow rate of the reformed gas decrease. Therefore, the rotation of the ammonia engine 2 may become unstable due to misfire, or the exhaust characteristics of the ammonia engine 2 may change. Further, if the reforming performance of the reforming catalyst 33 deteriorates, the endothermic capacity of the reforming catalyst 33 decreases, and accordingly the temperature of the reformed gas increases.

Thus, whether the reforming performance of the reforming catalyst 33 is deteriorated or not is detected in the first idling period of the ammonia engine 2. Specifically, the temperature of the reformed gas flowing through the reformed gas flow path 27 is detected by the temperature sensor 38, and the amount of rotation fluctuation of the ammonia engine 2 is detected by the rotation fluctuation detector 40.

When the temperature of the reformed gas is equal to or higher than threshold A and the amount of rotation fluctuation of the ammonia engine 2 is equal to or greater than threshold B, it is determined that the reforming performance of the reforming catalyst 33 is deteriorated. When, even though the temperature of the reformed gas is equal to or higher than threshold A, the amount of rotation fluctuation of the ammonia engine 2 is less than threshold B, it is determined that the reforming performance of the reforming catalyst 33 is not deteriorated. Also, when, even though the amount of rotation fluctuation of the ammonia engine 2 is equal to or greater than threshold B, the temperature of the reformed gas is lower than threshold A, it is determined that the reforming performance of the reforming catalyst 33 is not deteriorated.

When it is determined that the reforming performance of the reforming catalyst 33 is deteriorated, an alarm is issued by the alarm 48. Thus, with the alarm 48, the user can immediately understand that it is necessary to replace the reforming catalyst 33.

Further, when it is determined that the reforming performance of the reforming catalyst 33 is deteriorated, the degree of opening of the reforming throttle valve 25 increases, and accordingly the flow rate of air supplied to the reformer 23 increases. Thereby, the total flow rate of the reformed gas generated by the reformer 23 increases.

After that, the main injector 5 is opened, and thereby ammonia gas is supplied to the combustion chamber 15 of the ammonia engine 2. Then, the ammonia gas combusts together with hydrogen in the reformed gas. Thereby, the start operation of the ammonia engine 2 is completed, and the state transitions to the steady state.

As above, in the present embodiment, when ammonia gas and air are supplied to the reformer 23, the ammonia gas is reformed by the reforming catalyst 33 of the reformer 23 and thereby a reformed gas containing hydrogen is generated, and the reformed gas flows through the reformed gas flow path 27 and is supplied to the ammonia engine 2. Then, ammonia gas and air are supplied to the ammonia engine 2, and thereby the ammonia gas is mixed with hydrogen and combusted in the ammonia engine 2. Here, if the reforming performance of the reforming catalyst 33 is deteriorated, the temperature of the reformed gas is increased as compared to that in the normal condition. The normal condition means a case where the reforming performance of the reforming catalyst 33 is not deteriorated (the same applies hereinafter). Further, if the reforming performance of the reforming catalyst 33 is deteriorated, the combustion of ammonia gas in the ammonia engine 2 is unstable, and therefore the amount of rotation fluctuation of the ammonia engine 2 is increased as compared to that in the normal condition. Thus, the temperature of the reformed gas and the amount of rotation fluctuation of the ammonia engine 2 are detected, and whether the reforming performance of the reforming catalyst 33 is deteriorated or not is detected based on the temperature of the reformed gas and the amount of rotation fluctuation of the ammonia engine 2. Specifically, when, in the idling period of the ammonia engine 2, the amount of rotation fluctuation of the ammonia engine 2 is equal to or greater than threshold B in a state where the temperature of the reformed gas is equal to or higher than threshold A, it is determined that the reforming performance of the reforming catalyst 33 is deteriorated. Thus, whether the reforming performance of the reforming catalyst 33 is deteriorated excessively is detected with high accuracy by using not only the temperature of the reformed gas but also the amount of rotation fluctuation of the ammonia engine 2, for the detection of deterioration in reforming performance of the reforming catalyst 33. Thereby, it can be understood whether or not the reforming performance of the reforming catalyst 33 is so deteriorated that the reforming catalyst 33 needs to be replaced. The phrase "the reforming performance of the reforming catalyst 33 deteriorates excessively" means that the reforming performance of the reforming catalyst 33 deteriorates to such a degree as to decrease to an insufficient level. When the reforming performance of the reforming catalyst 33 is insufficient, the amount of hydrogen generated by the reformer 23 decreases, and consequently the ratio of hydrogen supplied to the ammonia engine 2 and the total amount of gas (the total amount of ammonia and hydrogen) decrease.

In the present embodiment, when, in the first idling period during the starting of the ammonia engine 2, the amount of rotation fluctuation of the ammonia engine 2 is equal to or greater than threshold B in a state where the temperature of the reformed gas is equal to or higher than threshold A, it is determined that the reforming performance of the reforming catalyst 33 is deteriorated. In the first idling period during the starting of the ammonia engine 2, ammonia gas and air are supplied to the reformer 23 under the same stable conditions. Therefore, whether the reforming performance of the reforming catalyst 33 is deteriorated excessively is detected with higher accuracy.

Further, in the present embodiment, when it is determined that the reforming performance of the reforming catalyst 33 is deteriorated, the reforming throttle valve 25 is controlled so that the flow rate of air supplied to the reformer 23 increases. If the reforming performance of the reforming catalyst 33 deteriorates, the amount of hydrogen generated by the reformer 23 decreases, and accordingly the total flow rate of the reformed gas supplied to the ammonia engine 2 decreases. Thus, when the reforming performance of the reforming catalyst 33 is deteriorated, the flow rate of air supplied to the reformer 23 is increased, and thereby the total flow rate of the reformed gas supplied to the ammonia engine 2 is secured.

Further, in the present embodiment, when the concentration of oxygen contained in the exhaust gas flowing through the exhaust passage 4 is higher than a target value, the reforming injector 26 is controlled so that the flow rate of ammonia gas supplied to the reformer 23 increases. Accordingly, the flow rate of unburned ammonia gas contained in the reformed gas supplied to the ammonia engine 2 increases. Therefore, even if the flow rate of air supplied to the ammonia engine 2 increases due to an increase in the flow rate of air supplied to the reformer 23, the necessary air-fuel ratio is maintained in the ammonia engine 2.

Figure 5:
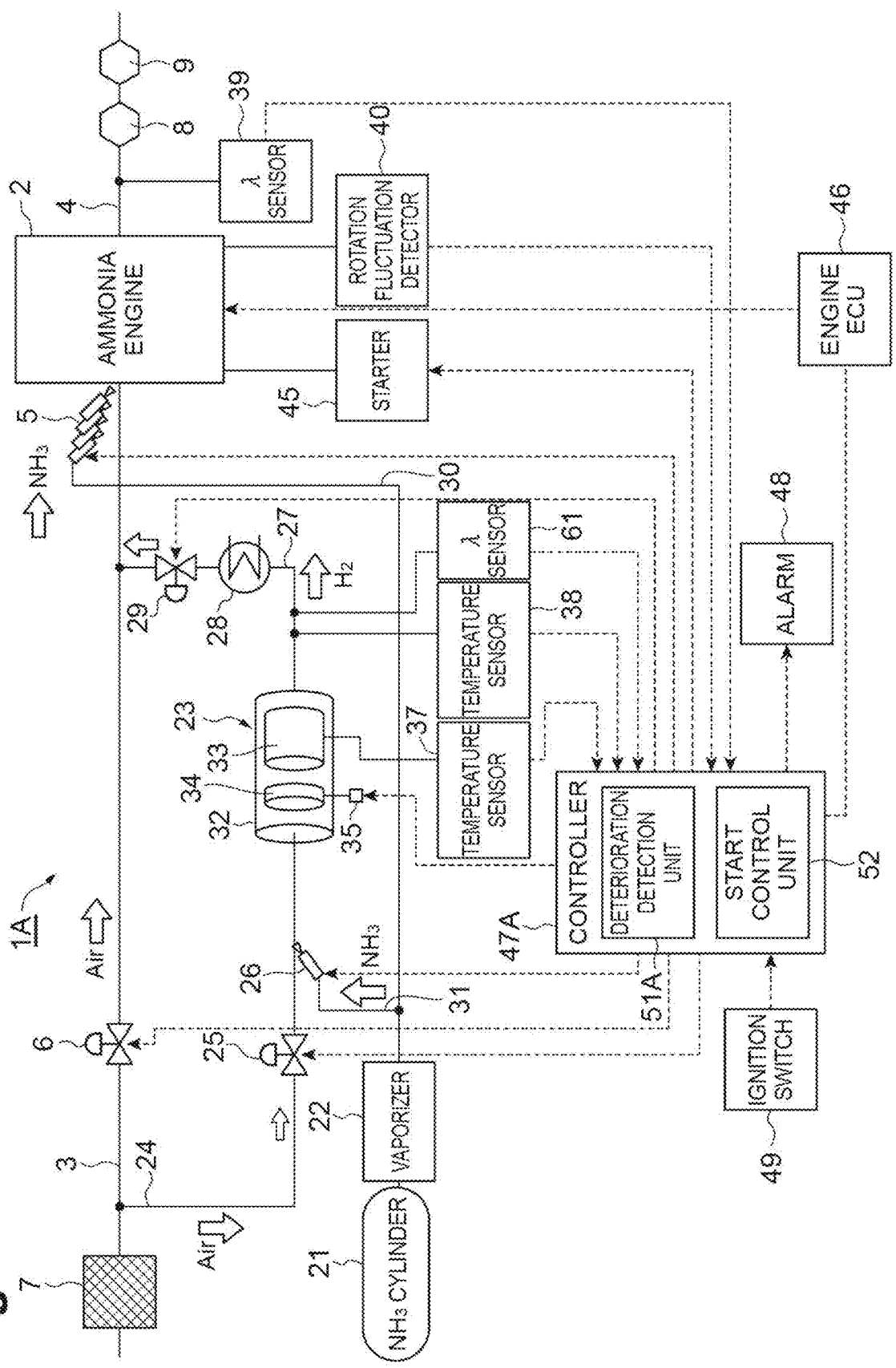
FIG. 5 is a schematic configuration diagram showing an engine system according to a second embodiment of the present disclosure.

FIG. 5 is a schematic configuration diagram showing an engine system according to a second embodiment of the present disclosure. In FIG. 5, an engine system 1A of the present embodiment includes a λ sensor 61 in addition to the configuration in the above first embodiment. The λ sensor 61 is a sensor (oxygen detection unit) that detects the concentration of residual oxygen contained in the reformed gas flowing through the reformed gas flow path 27.

Further, the engine system 1A includes a controller 47A in place of the controller 47 in the above first embodiment. The controller 47A includes a deterioration detection unit 51A and the start control unit 52 described above.

The deterioration detection unit 51A detects whether the reforming performance of the reforming catalyst 33 of the reformer 23 is deteriorated or not based on the detection values of the temperature sensor 38, the λ sensor 61, and the rotation fluctuation detector 40. When, in the first idling period during the starting of the ammonia engine 2, the amount of rotation fluctuation of the ammonia engine 2 is equal to or greater than threshold B in a state where the temperature of the reformed gas is equal to or higher than threshold A and the concentration of residual oxygen contained in the reformed gas is equal to or higher than threshold C, the deterioration detection unit 51A determines that the reforming performance of the reforming catalyst 33 is deteriorated.

Figure 6:
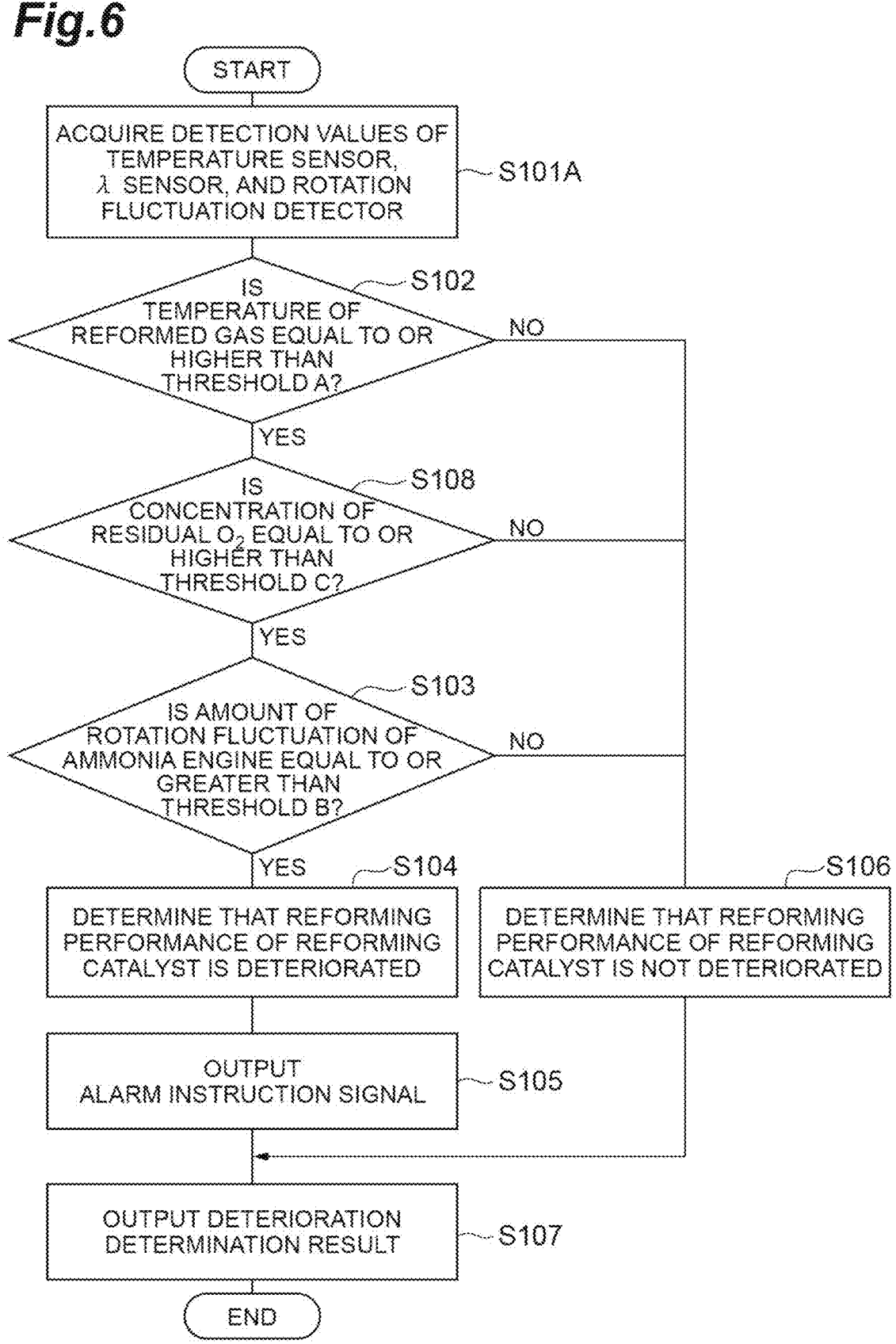
FIG. 6 is a flowchart showing a procedure of deterioration detection processing executed by a deterioration detection unit shown in FIG. 5.

FIG. 6 is a flowchart showing a procedure of deterioration detection processing executed by the deterioration detection unit 51A, and corresponds to FIG. 3.

In FIG. 6, the deterioration detection unit 51A first acquires the detection values of the temperature sensor 38, the λ sensor 61, and the rotation fluctuation detector 40 (step S101A). Then, based on the detection value of the temperature sensor 38, the deterioration detection unit 51A determines whether or not the temperature of the reformed gas flowing through the reformed gas flow path 27 is equal to or higher than threshold A (step S102).

When the deterioration detection unit 51A determines that the temperature of the reformed gas is equal to or higher than threshold A, the deterioration detection unit 51A determines, based on the detection value of the λ sensor 61, whether or not the concentration of residual oxygen contained in the reformed gas is equal to or higher than threshold C (step S108). Threshold C is a value according to deterioration in reforming performance of the reforming catalyst 33 (a third threshold), and is specified in advance by experiment or the like.

When the deterioration detection unit 51A determines that the concentration of residual oxygen contained in the reformed gas is equal to or higher than threshold C, the deterioration detection unit 51A determines, based on the detection value of the rotation fluctuation detector 40, whether or not the amount of rotation fluctuation of the ammonia engine 2 is equal to or greater than threshold B (step S103).

When the deterioration detection unit 51A determines that the amount of rotation fluctuation of the ammonia engine 2 is equal to or greater than threshold B, the deterioration detection unit 51A determines that the reforming performance of the reforming catalyst 33 is deteriorated (step S104). Then, the deterioration detection unit 51A sequentially executes steps S105 and S107 above.

When the deterioration detection unit 51A determines in step S102 that the temperature of the reformed gas flowing through the reformed gas flow path 27 is lower than threshold A, when the deterioration detection unit 51A determines in step S108 that the concentration of residual oxygen contained in the reformed gas is lower than threshold C, or when the deterioration detection unit 51A determines in step S103 that the amount of rotation fluctuation of the ammonia engine 2 is less than threshold B, the deterioration detection unit 51A determines that the reforming performance of the reforming catalyst 33 is not deteriorated (step S106). Then, the deterioration detection unit 51A executes step S107 above.

If the reforming performance of the reforming catalyst 33 of the reformer 23 deteriorates, the amount of hydrogen generated by the reformer 23 decreases, and accordingly the concentration of residual oxygen contained in the reformed gas becomes higher than in the normal condition.

Thus, in the present embodiment, whether the reforming performance of the reforming catalyst 33 is deteriorated excessively is detected with still higher accuracy by using the concentration of residual oxygen contained in the reformed gas in addition to the temperature of the reformed gas and the amount of rotation fluctuation of the ammonia engine 2, for the detection of deterioration in reforming performance of the reforming catalyst 33.

Figure 7:
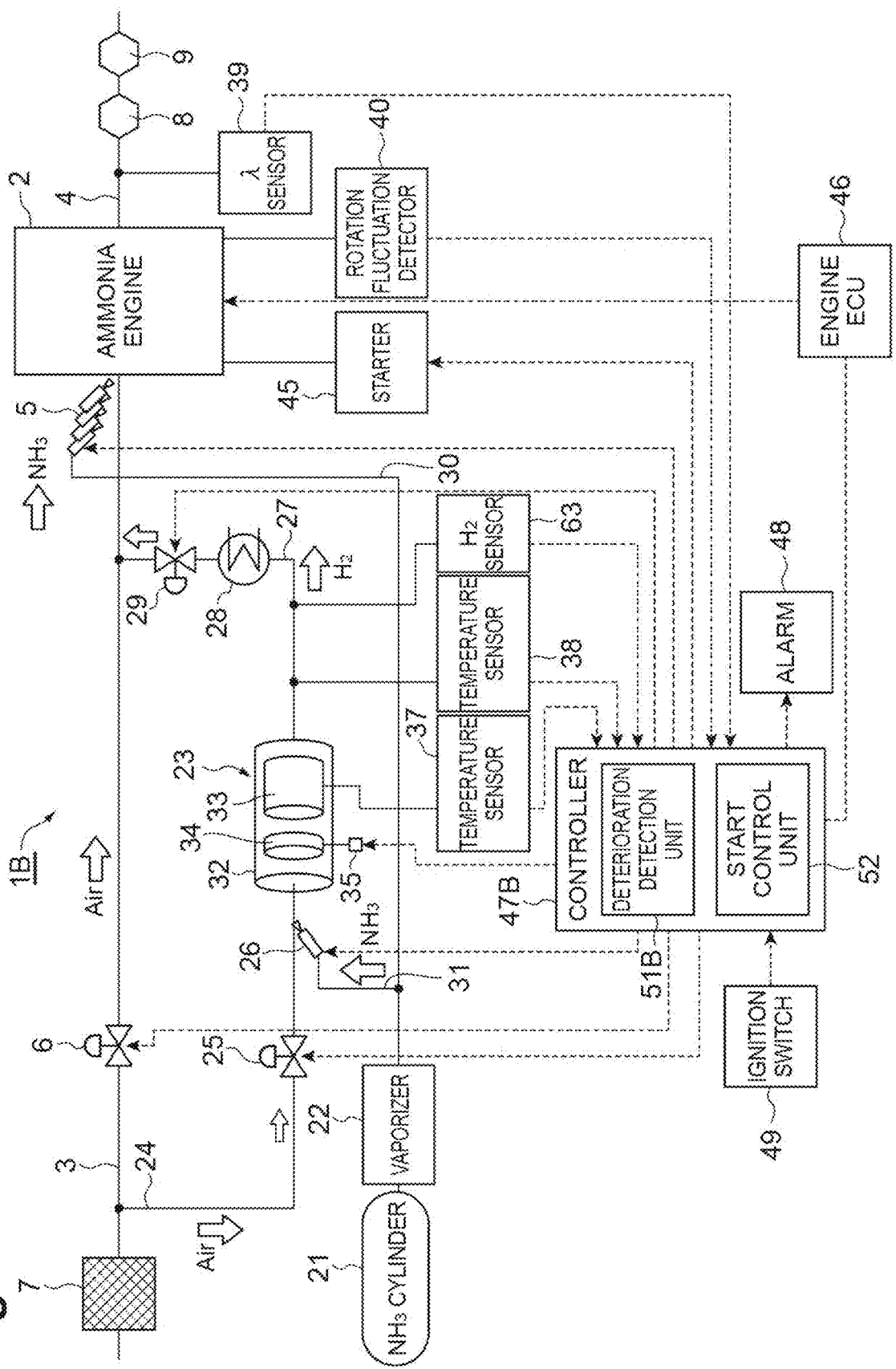
FIG. 7 is a schematic configuration diagram showing an engine system according to a third embodiment of the present disclosure.

FIG. 7 is a schematic configuration diagram showing an engine system according to a third embodiment of the present disclosure. In FIG. 7, an engine system 1B of the present embodiment includes a hydrogen sensor 63 in addition to the configuration in the above first embodiment. The hydrogen sensor 63 is a sensor (hydrogen detection unit) that detects the concentration of hydrogen contained in the reformed gas flowing through the reformed gas flow path 27.

Further, the engine system 1B includes a controller 47B in place of the controller 47 in the above first embodiment. The controller 47B includes a deterioration detection unit 51B and the start control unit 52 described above.

The deterioration detection unit 51B detects whether the reforming performance of the reforming catalyst 33 of the reformer 23 is deteriorated or not based on the detection values of the temperature sensor 38, the hydrogen sensor 63, and the rotation fluctuation detector 40. When, in the first idling period during the starting of the ammonia engine 2, the amount of rotation fluctuation of the ammonia engine 2 is equal to or greater than threshold B in a state where the temperature of the reformed gas is equal to or higher than threshold A and the concentration of hydrogen contained in the reformed gas is equal to or lower than threshold D, the deterioration detection unit 51B determines that the reforming performance of the reforming catalyst 33 is deteriorated. Threshold D is a value according to deterioration in reforming performance of the reforming catalyst 33 (a fourth threshold), and is specified in advance by experiment or the like. That is, in step S101A of FIG. 6, the deterioration detection unit 51B may acquire the detection value of the hydrogen sensor 63 instead of that of the λ sensor 61. The deterioration detection unit 51B may determine whether or not the concentration of hydrogen contained in the reformed gas is equal to or lower than threshold D, based on the detection value of the hydrogen sensor 63 instead of the detection value of the λ sensor 61 in step S108 of FIG. 6.

If the reforming performance of the reforming catalyst 33 of the reformer 23 deteriorates, the amount of hydrogen generated by the reformer 23 decreases, and accordingly the concentration of hydrogen contained in the reformed gas becomes lower than in the normal condition.

Thus, in the present embodiment, whether the reforming performance of the reforming catalyst 33 is deteriorated excessively is detected with still higher accuracy by using the concentration of hydrogen contained in the reformed gas in addition to the temperature of the reformed gas and the amount of rotation fluctuation of the ammonia engine 2, for the detection of deterioration in reforming performance of the reforming catalyst 33.

Figure 8:
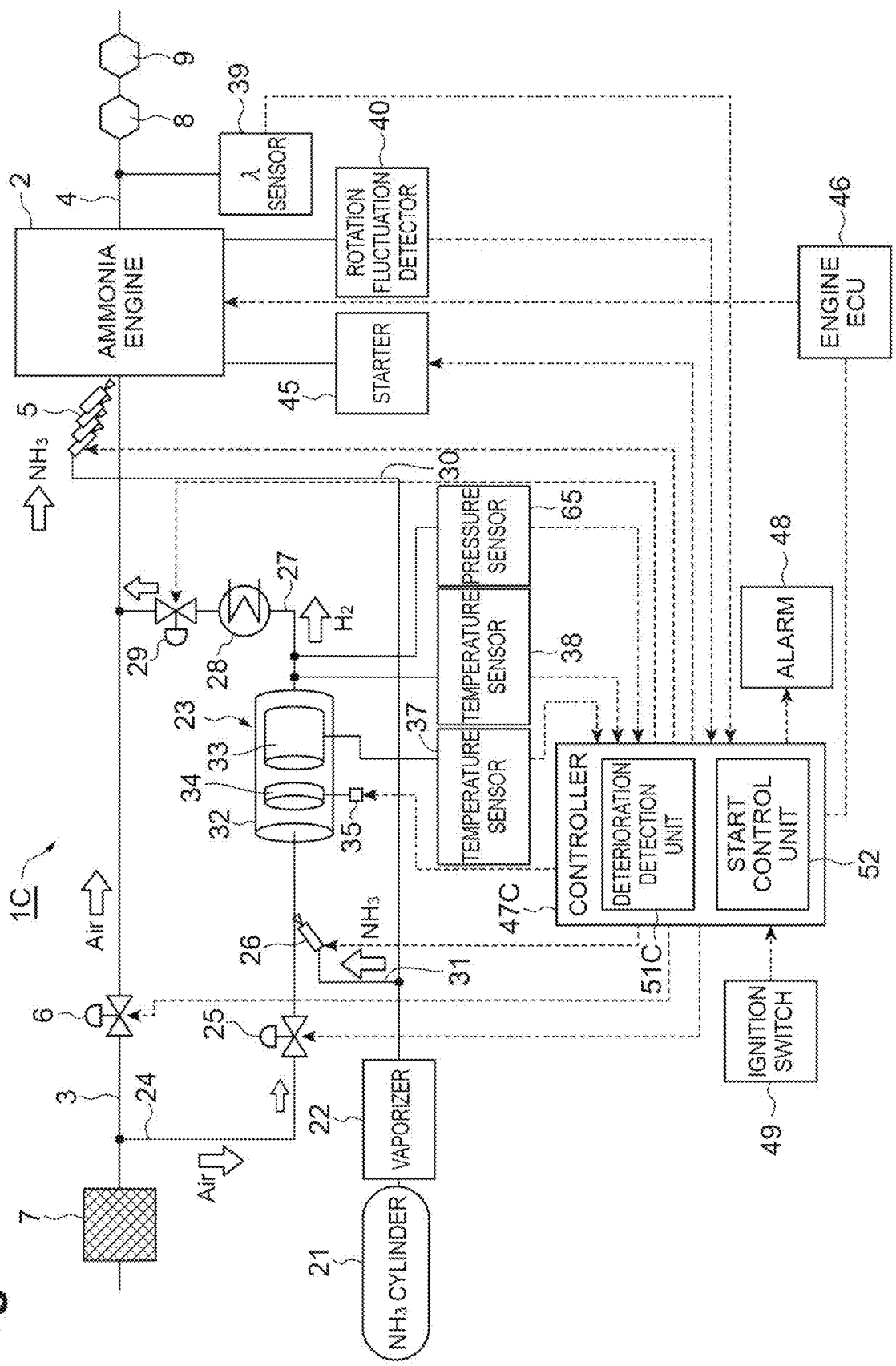
FIG. 8 is a schematic configuration diagram showing an engine system according to a fourth embodiment of the present disclosure.

FIG. 8 is a schematic configuration diagram showing an engine system according to a fourth embodiment of the present disclosure. In FIG. 8, an engine system 1C of the present embodiment includes a pressure sensor 65 in addition to the configuration in the above first embodiment. The pressure sensor 65 is a sensor (pressure detection unit) that detects the pressure in the reformed gas flow path 27.

Further, the engine system 1C includes a controller 47C in place of the controller 47 in the above first embodiment. The controller 47C includes a deterioration detection unit 51C and the start control unit 52 described above.

The deterioration detection unit 51C detects whether the reforming performance of the reforming catalyst 33 of the reformer 23 is deteriorated or not based on the detection values of the temperature sensor 38, the pressure sensor 65, and the rotation fluctuation detector 40. When, in the first idling period during the starting of the ammonia engine 2, the amount of rotation fluctuation of the ammonia engine 2 is equal to or greater than threshold B in a state where the temperature of the reformed gas is equal to or higher than threshold A and the pressure in the reformed gas flow path 27 is equal to or lower than threshold E, the deterioration detection unit 51C determines that the reforming performance of the reforming catalyst 33 is deteriorated. Threshold E is a value according to deterioration in reforming performance of the reforming catalyst 33 (a fifth threshold), and is specified in advance by experiment or the like. That is, in step S101A of FIG. 6, the deterioration detection unit 51C may acquire the detection value of the pressure sensor 65 instead of that of the λ sensor 61. In step S108 of FIG. 6, the deterioration detection unit 51C may, based on the detection value of the pressure sensor 65 instead of the detection value of the λ sensor 61, determine whether or not the pressure in the reformed gas flow path 27 is equal to or lower than threshold E.

If the reforming performance of the reforming catalyst 33 of the reformer 23 deteriorates, the amount of hydrogen generated by the reformer 23 decreases, and accordingly the total flow rate of the reformed gas flowing through the reformed gas flow path 27 decreases. Accordingly, the pressure in the reformed gas flow path 27 becomes lower than in the normal condition.

Thus, in the present embodiment, whether the reforming performance of the reforming catalyst 33 is deteriorated excessively is detected with still higher accuracy by using the pressure in the reformed gas flow path 27 in addition to the temperature of the reformed gas and the amount of rotation fluctuation of the ammonia engine 2, for the detection of deterioration in reforming performance of the reforming catalyst 33.

Figure 9:
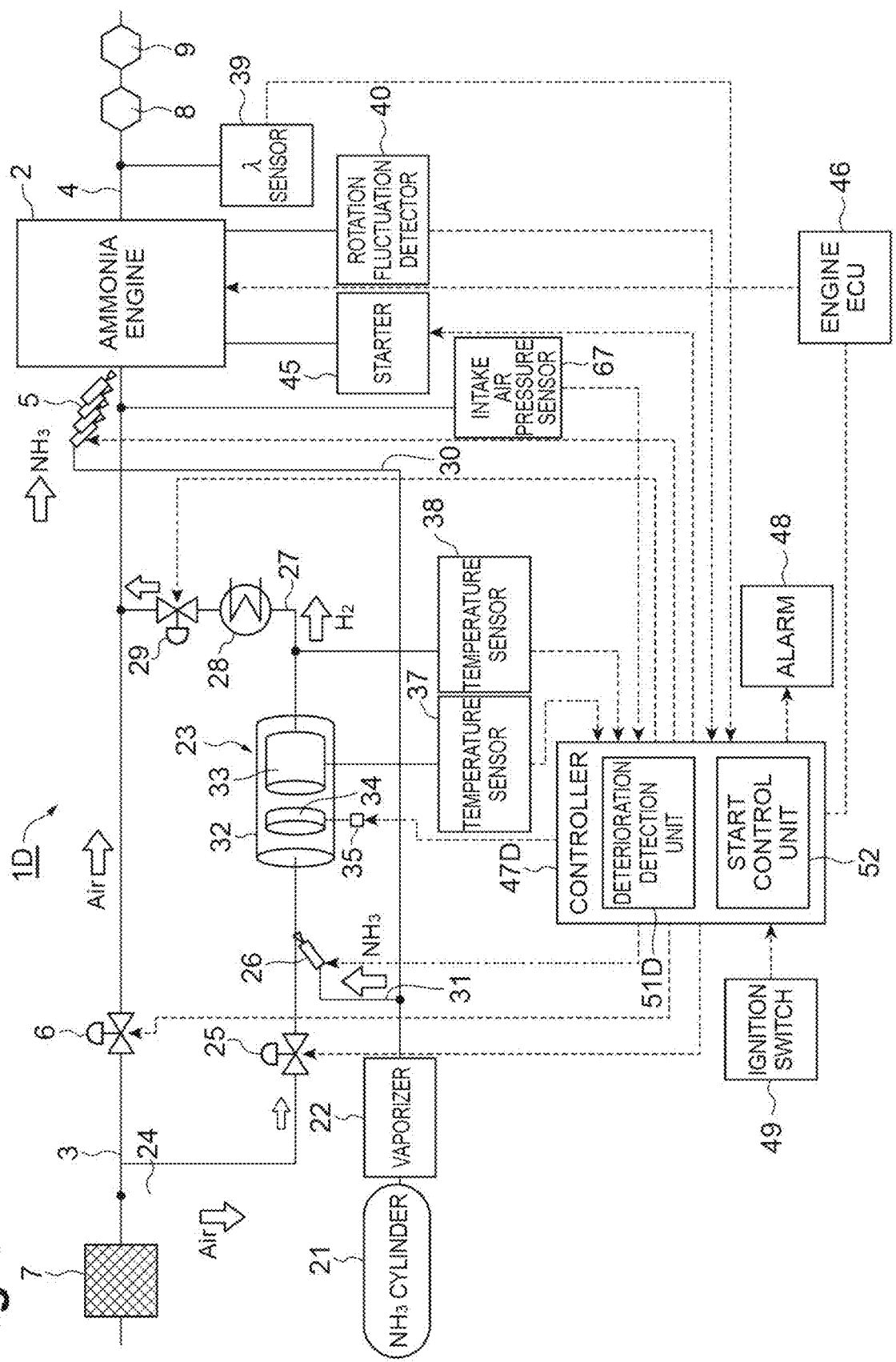
FIG. 9 is a schematic configuration diagram showing an engine system according to a fifth embodiment of the present disclosure.

FIG. 9 is a schematic configuration diagram showing an engine system according to a fifth embodiment of the present disclosure. In FIG. 9, an engine system 1D of the present embodiment includes an intake air pressure sensor 67 in addition to the configuration in the above first embodiment. The intake air pressure sensor 67 is a sensor (pressure detection unit) that detects the pressure in the intake passage 3.

Further, the engine system 1D includes a controller 47D in place of the controller 47 in the above first embodiment. The controller 47D includes a deterioration detection unit 51D and the start control unit 52 described above.

The deterioration detection unit 51D detects whether the reforming performance of the reforming catalyst 33 of the reformer 23 is deteriorated or not based on the detection values of the temperature sensor 38, the intake air pressure sensor 67, and the rotation fluctuation detector 40. When, in the first idling period during the starting of the ammonia engine 2, the amount of rotation fluctuation of the ammonia engine 2 is equal to or greater than threshold B in a state where the temperature of the reformed gas is equal to or higher than threshold A and the pressure in the intake passage 3 is equal to or lower than threshold F, the deterioration detection unit 51D determines that the reforming performance of the reforming catalyst 33 is deteriorated. Threshold F is a value according to deterioration in reforming performance of the reforming catalyst 33 (a sixth threshold), and is specified in advance by experiment or the like. That is, in step S101A of FIG. 6, the deterioration detection unit 51D may acquire the detection value of the intake air pressure sensor 67 instead of that of the λ sensor 61. The deterioration detection unit 51D may determine whether or not the pressure in the intake passage 3 is equal to or lower than threshold F, based on the detection value of the intake air pressure sensor 67 instead of the detection value of the λ sensor 61 in step S108 of FIG. 6.

If the reforming performance of the reforming catalyst 33 of the reformer 23 deteriorates, the amount of hydrogen generated by the reformer 23 decreases, and accordingly the total flow rate of the reformed gas flowing through the reformed gas flow path 27 decreases. Accordingly, the pressure in the intake passage 3 connected to the reformed gas flow path 27 becomes lower than in the normal condition.

Thus, in the present embodiment, whether the reforming performance of the reforming catalyst 33 is deteriorated excessively is detected with still higher accuracy by using the pressure in the intake passage 3 in addition to the temperature of the reformed gas and the amount of rotation fluctuation of the ammonia engine 2, for the detection of deterioration in reforming performance of the reforming catalyst 33.

Figure 10:
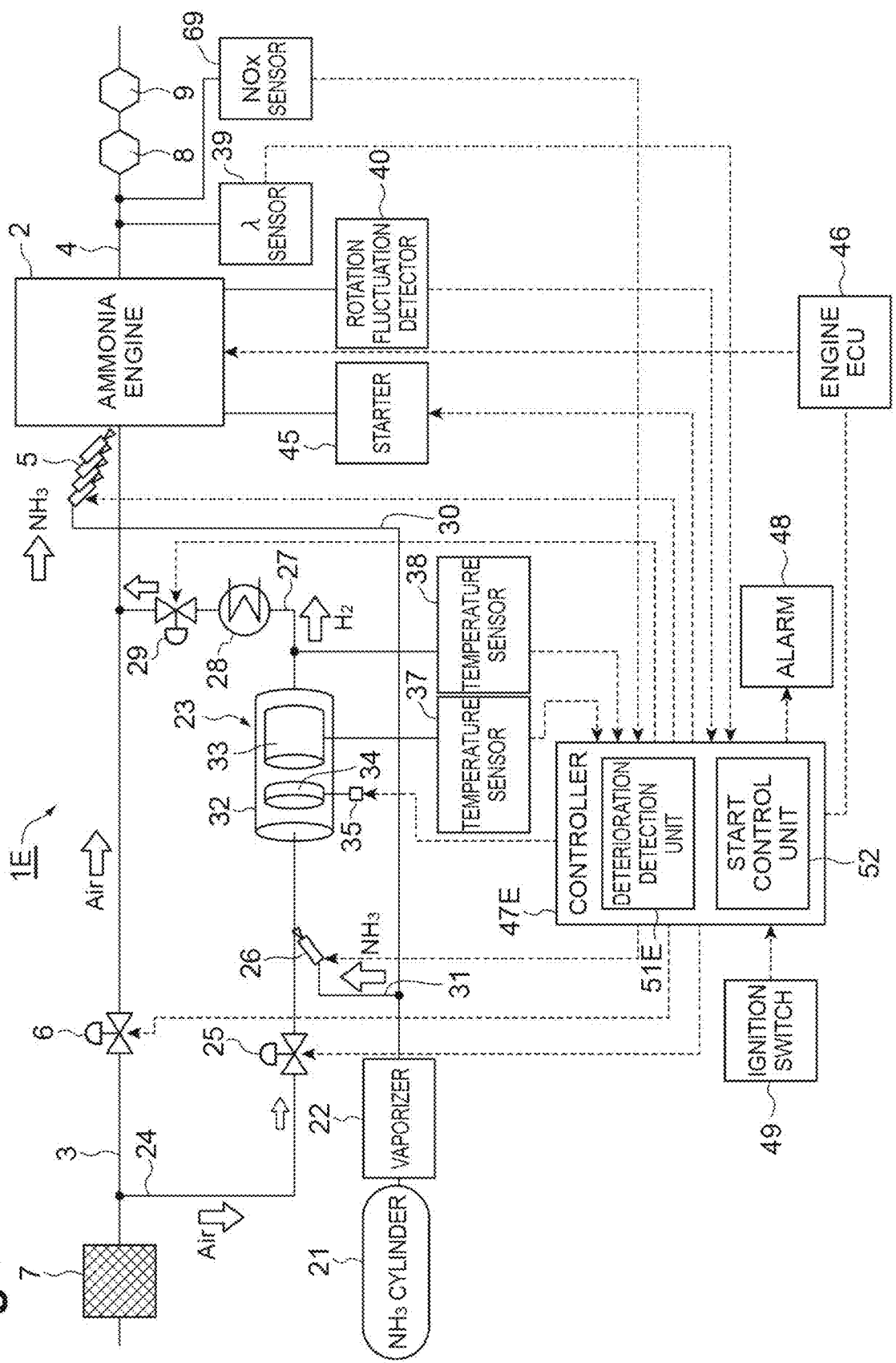
FIG. 10 is a schematic configuration diagram showing an engine system according to a sixth embodiment of the present disclosure.

FIG. 10 is a schematic configuration diagram showing an engine system according to a sixth embodiment of the present disclosure. In FIG. 10, an engine system 1E of the present embodiment includes a NOx sensor 69 in addition to the configuration in the above first embodiment. The NOx sensor 69 is a sensor (nitrogen oxide detection unit) that detects the concentration of nitrogen oxides (NOx) contained in the exhaust gas flowing through the exhaust passage 4.

Further, the engine system 1E includes a controller 47E in place of the controller 47 in the above first embodiment. The controller 47E includes a deterioration detection unit 51E and the start control unit 52 described above.

The deterioration detection unit 51E detects whether the reforming performance of the reforming catalyst 33 of the reformer 23 is deteriorated or not based on the detection values of the temperature sensor 38, the NOx sensor 69, and the rotation fluctuation detector 40. When, in the first idling period during the starting of the ammonia engine 2, the amount of rotation fluctuation of the ammonia engine 2 is equal to or greater than threshold B in a state where the temperature of the reformed gas is equal to or higher than threshold A and the concentration of NOx contained in the exhaust gas is equal to or lower than threshold G, the deterioration detection unit 51E determines that the reforming performance of the reforming catalyst 33 is deteriorated. Threshold G is a value according to deterioration in reforming performance of the reforming catalyst 33 (a seventh threshold), and is specified in advance by experiment or the like. That is, in step S101A of FIG. 6, the deterioration detection unit 51E may acquire the detection value of the NOx sensor 69 instead of that of the λ sensor 61. The deterioration detection unit 51E may determine whether or not the concentration of NOx contained in the exhaust gas is equal to or lower than threshold G, based on the detection value of the NOx sensor 69 instead of the detection value of the λ sensor 61 in step S108 of FIG. 6.

When the concentration of oxygen contained in the exhaust gas is the same, the concentration of NOx contained in the exhaust gas decreases as the ratio of hydrogen supplied to the ammonia engine 2 decreases. If the reforming performance of the reforming catalyst 33 of the reformer 23 deteriorates, the amount of hydrogen generated by the reformer 23 decreases, and accordingly the ratio of hydrogen supplied to the ammonia engine 2 decreases. Accordingly, the concentration of NOx contained in the exhaust gas becomes lower than in the normal condition.

Thus, in the present embodiment, whether the reforming performance of the reforming catalyst 33 is deteriorated excessively is detected with still higher accuracy by using the concentration of NOx contained in the exhaust gas in addition to the temperature of the reformed gas and the amount of rotation fluctuation of the ammonia engine 2, for the detection of deterioration in reforming performance of the reforming catalyst 33.

If the reforming performance of the reforming catalyst 33 deteriorates, as described above, the ratio of hydrogen supplied to the ammonia engine 2 decreases, and accordingly the concentration of NOx contained in the exhaust gas becomes lower than in the normal condition. Accordingly, the concentration of ammonia contained in the exhaust gas becomes higher than in the normal condition. Thus, an ammonia sensor that detects the concentration of ammonia contained in the exhaust gas may be used in place of the NOx sensor 69.

Hereinabove, some embodiments of the present disclosure are described; however, the present disclosure is not limited to the above embodiments. For example, the above second to sixth embodiments may be implemented in combination.

Although in the above embodiments, when it is determined that the reforming performance of the reforming catalyst 33 of the reformer 23 is deteriorated, the reforming throttle valve 25 is controlled by the start control unit 52 so that the flow rate of air supplied to the reformer 23 increases, the method of control by the start control unit 52 is not particularly limited thereto, and various modifications are possible.

Figure 11:
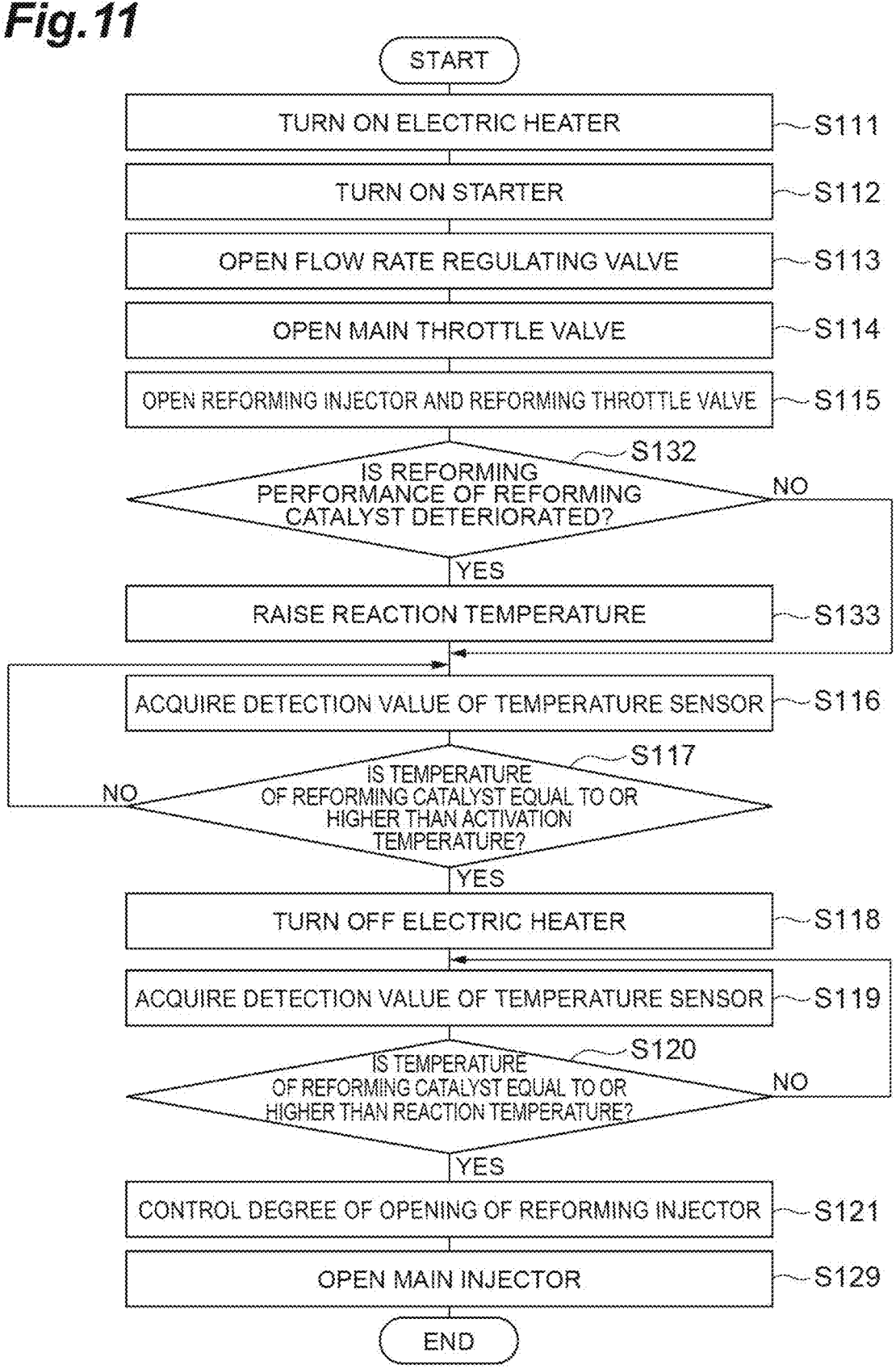
FIG. 11 is a flowchart showing a modification example of the procedure of start control processing shown in FIG. 4.

FIG. 11 is a flowchart showing a modification example of the procedure of start control processing executed by the start control unit 52, and corresponds to FIG. 4.

In FIG. 11, the start control unit 52 sequentially executes steps S111 to S115 above, and then determines whether the reforming performance of the reforming catalyst 33 of the reformer 23 is deteriorated or not based on the result of detection by the deterioration detection unit 51 (step S132).

Figure 12:
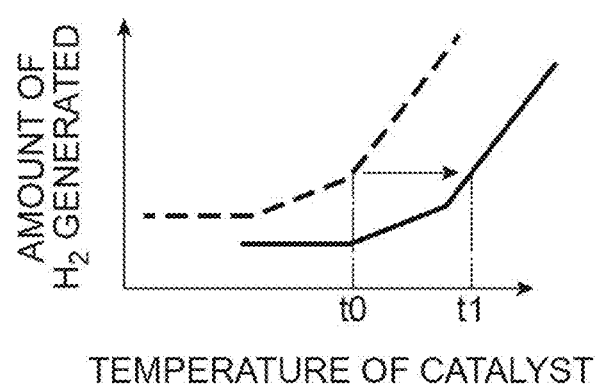
FIG. 12 is a graph showing an example of reforming characteristics of a reforming catalyst.

When the start control unit 52 determines that the reforming performance of the reforming catalyst 33 is deteriorated, the start control unit 52 changes the setting of the reaction temperature (described above) as a comparative value used in step S120 to a higher value than in the normal condition, in which the reforming performance of the reforming catalyst 33 is not deteriorated (step S133). That is, as shown in FIG. 12, the start control unit 52 changes the reaction temperature to a temperature t1 higher than the reaction temperature to in the normal condition. Temperature t1 is a reaction temperature at which a desired amount of hydrogen is generated when the reforming performance of the reforming catalyst 33 is deteriorated. Then, the start control unit 52 sequentially executes steps S116 to S121, and S129 above.

When the start control unit 52 determines in step S132 that the reforming performance of the reforming catalyst 33 is not deteriorated, the start control unit 52 sequentially executes steps S116 to S121, and S129 above without executing step S133.

In the present modification example thus designed, even if the reforming performance of the reforming catalyst 33 of the reformer 23 is deteriorated, the reforming catalyst 33 continues to be heated by the electric heater 34 until a desired amount of hydrogen is generated by the reformer 23, by setting the reaction temperature to a higher value than in the normal condition.

Figure 13:
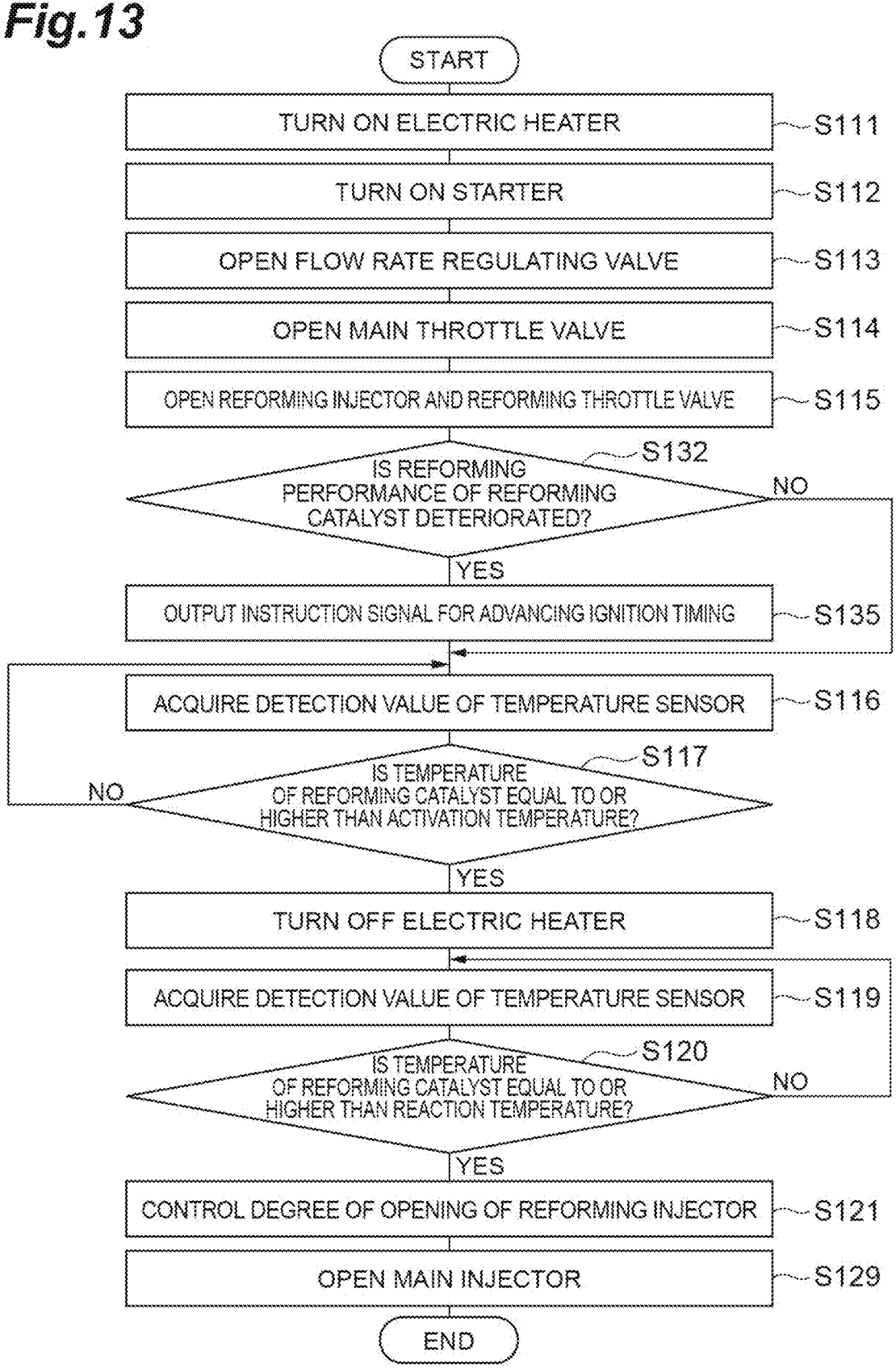
FIG. 13 is a flowchart showing another modification example of the procedure of start control processing shown in FIG. 4.

FIG. 13 is a flowchart showing another modification example of the procedure of start control processing executed by the start control unit 52, and corresponds to FIG. 4.

In FIG. 13, the start control unit 52 sequentially executes steps S111 to S115 above, and then determines whether the reforming performance of the reforming catalyst 33 of the reformer 23 is deteriorated or not based on the result of detection by the deterioration detection unit 51 (step S132).

When the start control unit 52 determines that the reforming performance of the reforming catalyst 33 is deteriorated, the start control unit 52 outputs, to the engine ECU 46, an ignition timing change instruction signal for making the ignition timing of the ammonia engine 2 earlier than in the normal condition (step S135). Then, the start control unit 52 sequentially executes steps S116 to S121, and S129 above.

Upon receiving the ignition timing change instruction signal from the start control unit 52, the engine ECU 46 controls the ignition plug 20 so that the ignition timing of the ammonia engine 2 becomes earlier than in the normal condition.

When the start control unit 52 determines in step S132 that the reforming performance of the reforming catalyst 33 is not deteriorated, the start control unit 52 sequentially executes steps S116 to S121, and S129 above without executing step S135.

When the ratio of hydrogen supplied to the ammonia engine 2 decreases as the reforming performance of the reforming catalyst 33 deteriorates, the combustion speed in the ammonia engine 2 decreases, and therefore the combustion may not be completed before the exhaust port 17 is opened by the exhaust valve 19.

In the present modification example, when the reforming performance of the reforming catalyst 33 is deteriorated, the ignition timing of the ammonia engine 2 is advanced, and thereby the combustion can be completed before the exhaust port 17 is opened by the exhaust valve 19.

Figure 14:
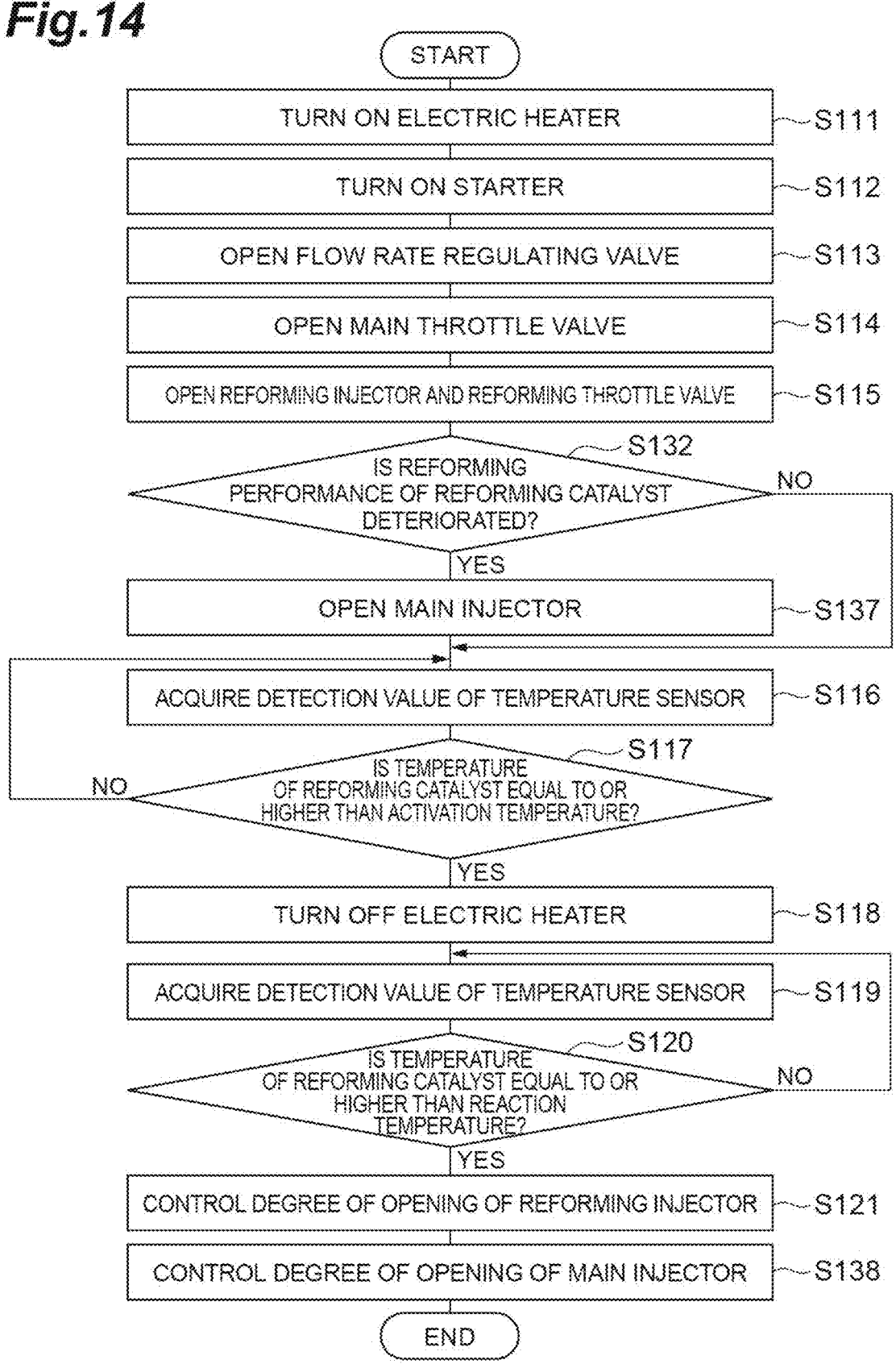
FIG. 14 is a flowchart showing still another modification example of the procedure of start control processing shown in FIG. 4.

FIG. 14 is a flowchart showing still another modification example of the procedure of start control processing executed by the start control unit 52, and corresponds to FIG. 4.

In FIG. 14, the start control unit 52 sequentially executes steps S111 to S115 above, and then determines whether the reforming performance of the reforming catalyst 33 of the reformer 23 is deteriorated or not based on the result of detection by the deterioration detection unit 51 (step S132).

When the start control unit 52 determines that the reforming performance of the reforming catalyst 33 is deteriorated, the start control unit 52 makes control to open the main injector 5 (step S137). Thereby, ammonia gas is supplied to the combustion chamber 15 of the ammonia engine 2. Then, the start control unit 52 sequentially executes steps S116 to S121 above. When the start control unit 52 determines that the reforming performance of the reforming catalyst 33 is not deteriorated, the start control unit 52 sequentially executes steps S116 to S121 above without executing step S137.

After executing step S121, the start control unit 52 controls the degree of opening of the main injector 5 (step S138). At this time, the start control unit 52 controls the degree of opening of the main injector 5 so that, for example, the air-fuel ratio of the ammonia engine 2 becomes an air-fuel ratio suitable for the idling state.

In the present modification example thus designed, when the reforming performance of the reforming catalyst 33 is deteriorated, ammonia gas is supplied to the ammonia engine 2 by the main injector 5, and therefore a decrease in the total flow rate of the reformed gas supplied to the ammonia engine 2 can be compensated for.

These modification examples may be implemented in combination with the above embodiments, or may be implemented in combination with each other.

In the above first to sixth embodiments, when the amount of rotation fluctuation of the ammonia engine 2 is equal to or greater than threshold B in a state where the temperature of the reformed gas is equal to or higher than threshold A, it is determined that the reforming performance of the reforming catalyst 33 is deteriorated; here, thresholds A and B may be changed taking into account the atmospheric pressure conditions of the outside air, the outside air temperature, the temperature of engine oil, the temperature of engine cooling water, the temperature of the reforming catalyst 33, etc.

For example, in the case where the temperature of engine oil and the temperature of engine cooling water are low in a cold district and furthermore the oxygen concentration is low on high ground, the amount of hydrogen necessary to maintain the first idling is increased, and to this end the air-fuel ratio in the reformer 23 is increased. Thus, threshold A may be set larger.

Further, for the operation conditions for times immediately before the first idling operation, in the case where the conditions for transition to the conditions of the first idling operation are steeper, threshold B may be set larger.

Further, in the above second embodiment, threshold C may be changed according to the conditions of ammonia gas and air supplied to the reformer 23, the temperature of the reforming catalyst 33 immediately before the first idling period, etc.

For example, in the case where the temperature of the reforming catalyst 33 immediately before the first idling period is high, since the conditions of the reforming activity of the reformer 23 are high, if the same amount of gas having the same composition as in the first idling period during the normal cold start is supplied to the reformer 23, the amount of the reformed gas generated is increased as compared to that in the first idling time during the normal cold start. Therefore, the total amount of gas outputted from the reformer 23 is increased, and accordingly the concentration of residual oxygen is reduced. Thus, threshold C may be set smaller.

Further, in the above third embodiment, threshold D may be changed according to the conditions of ammonia gas and air supplied to the reformer 23, the temperature of the reforming catalyst 33 immediately before the first idling period, etc.

For example, in the case where the temperature of the reforming catalyst 33 immediately before the first idling period is high, since the conditions of the reforming activity of the reformer 23 are high, if the same amount of gas having the same composition as in the first idling period during the normal cold start is supplied to the reformer 23, the amount of hydrogen generated is increased as compared to that in the first idling time during the normal cold start. Therefore, the concentration of hydrogen contained in the reformed gas is increased. Thus, threshold D may be set larger.

Further, in the above fourth and fifth embodiments, thresholds E and F may be changed according to the conditions of ammonia gas and air supplied to the reformer 23, the temperature of the reforming catalyst 33 immediately before the first idling period, etc.

For example, in the case where the temperature of the reforming catalyst 33 immediately before the first idling period is high, since the conditions of the reforming activity of the reformer 23 are high, if the same amount of gas having the same composition as in the first idling period during the normal cold start is supplied to the reformer 23, the amount of the reformed gas generated is increased as compared to that in the first idling time during the normal cold start. Therefore, the total amount of gas outputted from the reformer 23 is increased, and accordingly the pressures in the reformed gas flow path 27 and the intake passage 3 are increased. Thus, thresholds E and F may be set larger.

Although in the above embodiments whether the reforming performance of the reforming catalyst 33 of the reformer 23 is deteriorated or not is detected in the first idling period during the cold start of the ammonia engine 2, the timing of the detection of deterioration in reforming performance of the reforming catalyst 33 is not particularly limited to the first idling period, and may be, for example, an idling period between travel operations as long as a load is not applied to the ammonia engine 2.

Further, although in the above embodiments the reforming catalyst 33 of the reformer 23 is heated by the electric heater 34, the configuration is not particularly limited thereto, and the reforming catalyst 33 may be heated by a combustor such as a tubular flame burner.

Further, although in the above embodiments the rotation fluctuation detector 40 includes a rotation fluctuation processing unit 43 that obtains the amount of rotation fluctuation of the ammonia engine 2, the configuration is not particularly limited thereto. The function of the rotation fluctuation processing unit 43 may be, for example, in the controller 47.

Further, although in the above embodiments the reformer 23 includes a reforming catalyst 33 having both the function of combusting ammonia gas and the function of decomposing ammonia gas into hydrogen, the configuration is not particularly limited to such a configuration. The reformer 23 may separately include a combustion catalyst for combusting ammonia gas and a reforming catalyst for decomposing ammonia gas into hydrogen.

Further, although ammonia gas is used as fuel in the above embodiments, the present disclosure is also applicable to an engine system that uses hydrocarbons or the like as fuel.

REFERENCE SIGNS LIST

1, 1A, 1B, 1C, 1D, 1E engine system
2 ammonia engine (engine)
3 intake passage
4 exhaust passage
5 main injector (first fuel supply valve)
6 main throttle valve (first flow rate control valve)
23 reformer
24 air flow path
25 reforming throttle valve (second flow rate control valve)
26 reforming injector (second fuel supply valve)
27 reformed gas flow path
33 reforming catalyst (catalyst)
38 temperature sensor (temperature detection unit)
39 λ sensor (in-exhaust oxygen detection unit)
40 rotation fluctuation detector (rotation fluctuation detection unit)
51, 51A, 51B, 51C, 51D, 51E deterioration detection unit
52 start control unit (control unit)
61 λ sensor (oxygen detection unit)
63 hydrogen sensor (hydrogen detection unit)
65 pressure sensor (pressure detection unit)
67 intake air pressure sensor (pressure detection unit)
69 NOx sensor (nitrogen oxide detection unit)
A threshold (first threshold)
B threshold (second threshold)
C threshold (third threshold)
D threshold (fourth threshold)
E threshold (fifth threshold)
F threshold (sixth threshold)
G threshold (seventh threshold)

The invention claimed is:

1. An engine system comprising:
an engine in which fuel combusts with hydrogen;
an intake passage through which air supplied to the engine flows;
an exhaust passage through which exhaust gas generated in the engine flows;
a first flow rate control valve provided on the intake passage and configured to control a flow rate of air supplied to the engine;
a first fuel supply valve configured to supply the fuel to the engine;
a reformer including a catalyst for decomposing the fuel into the hydrogen and configured to reform the fuel to generate a reformed gas containing the hydrogen;
an air flow path through which air supplied to the reformer flows;
a second flow rate control valve provided on the air flow path and configured to control a flow rate of air supplied to the reformer;
a second fuel supply valve configured to supply the fuel to the reformer;
a reformed gas flow path through which the reformed gas generated by the reformer flows toward the engine;
a temperature detection unit configured to detect a temperature of the reformed gas flowing through the reformed gas flow path;
a rotation fluctuation detection unit configured to detect an amount of rotation fluctuation of the engine; and
a deterioration detection unit configured to detect whether reforming performance of the catalyst of the reformer is deteriorated or not based on detection values of the temperature detection unit and the rotation fluctuation detection unit,
wherein when, in an idling period of the engine, the amount of rotation fluctuation of the engine is equal to or greater than a second threshold in a state where the temperature of the reformed gas is equal to or higher than a first threshold, the deterioration detection unit determines that the reforming performance of the catalyst is deteriorated.

2. The engine system according to claim 1,
wherein when, in a first idling period during starting of the engine, the amount of rotation fluctuation of the engine is equal to or greater than the second threshold in a state where the temperature of the reformed gas is equal to or higher than the first threshold, the deterioration detection unit determines that the reforming performance of the catalyst is deteriorated.

3. The engine system according to claim 1, further comprising
an oxygen detection unit configured to detect a concentration of residual oxygen contained in the reformed gas flowing through the reformed gas flow path,
wherein when, in an idling period of the engine, the amount of rotation fluctuation of the engine is equal to or greater than the second threshold in a state where the temperature of the reformed gas is equal to or higher than the first threshold and the concentration of the residual oxygen contained in the reformed gas is equal to or higher than a third threshold, the deterioration detection unit determines that the reforming performance of the catalyst is deteriorated.

4. The engine system according to claim 1, further comprising
a hydrogen detection unit configured to detect a concentration of the hydrogen contained in the reformed gas flowing through the reformed gas flow path,
wherein when, in an idling period of the engine, the amount of rotation fluctuation of the engine is equal to or greater than the second threshold in a state where the temperature of the reformed gas is equal to or higher than the first threshold and the concentration of the hydrogen contained in the reformed gas is equal to or lower than a fourth threshold, the deterioration detection unit determines that the reforming performance of the catalyst is deteriorated.

5. The engine system according to claim 1, further comprising
a pressure detection unit configured to detect a pressure in the reformed gas flow path, wherein when, in an idling period of the engine, the amount of rotation fluctuation of the engine is equal to or greater than the second threshold in a state where the temperature of the reformed gas is equal to or higher than the first threshold and the pressure in the reformed gas flow path is equal to or lower than a fifth threshold, the deterioration detection unit determines that the reforming performance of the catalyst is deteriorated.

6. The engine system according to claim 1, further comprising
a pressure detection unit configured to detect a pressure in the intake passage,
wherein when, in an idling period of the engine, the amount of rotation fluctuation of the engine is equal to or greater than the second threshold in a state where the temperature of the reformed gas is equal to or higher than the first threshold and the pressure in the intake passage is equal to or lower than a sixth threshold, the deterioration detection unit determines that the reforming performance of the catalyst is deteriorated.

7. The engine system according to claim 1, further comprising a control unit configured to, when it is determined by the deterioration detection unit that the reforming performance of the catalyst is deteriorated, control the second flow rate control valve so that a flow rate of air supplied to the reformer increases.

8. An engine system comprising:
an engine in which fuel combusts with hydrogen;
an intake passage through which air supplied to the engine flows;
an exhaust passage through which exhaust gas generated in the engine flows;
a first flow rate control valve provided on the intake passage and configured to control a flow rate of air supplied to the engine;
a first fuel supply valve configured to supply the fuel to the engine;
a reformer including a catalyst for decomposing the fuel into the hydrogen and configured to reform the fuel to generate a reformed gas containing the hydrogen;
an air flow path through which air supplied to the reformer flows;
a second flow rate control valve provided on the air flow path and configured to control a flow rate of air supplied to the reformer;
a second fuel supply valve configured to supply the fuel to the reformer;
a reformed gas flow path through which the reformed gas generated by the reformer flows toward the engine;
a temperature detection unit configured to detect a temperature of the reformed gas flowing through the reformed gas flow path;
a rotation fluctuation detection unit configured to detect an amount of rotation fluctuation of the engine;
a deterioration detection unit configured to detect whether reforming performance of the catalyst of the reformer is deteriorated or not based on detection values of the temperature detection unit and the rotation fluctuation detection unit,
wherein when, in an idling period of the engine, the amount of rotation fluctuation of the engine is equal to or greater than a second threshold in a state where the temperature of the reformed gas is equal to or higher than a first threshold, the deterioration detection unit determines that the reforming performance of the catalyst is deteriorated; and
a nitrogen oxide detection unit configured to detect a concentration of nitrogen oxides contained in the exhaust gas flowing through the exhaust passage,
wherein when, in an idling period of the engine, the amount of rotation fluctuation of the engine is equal to or greater than the second threshold in a state where the temperature of the reformed gas is equal to or higher than the first threshold and the concentration of the nitrogen oxides is equal to or lower than a seventh threshold, the deterioration detection unit determines that the reforming performance of the catalyst is deteriorated.

9. An engine system comprising:
an engine in which fuel combusts with hydrogen;
an intake passage through which air supplied to the engine flows;
an exhaust passage through which exhaust gas generated in the engine flows;
a first flow rate control valve provided on the intake passage and configured to control a flow rate of air supplied to the engine;
a first fuel supply valve configured to supply the fuel to the engine;
a reformer including a catalyst for decomposing the fuel into the hydrogen and configured to reform the fuel to generate a reformed gas containing the hydrogen;
an air flow path through which air supplied to the reformer flows;
a second flow rate control valve provided on the air flow path and configured to control a flow rate of air supplied to the reformer;
a second fuel supply valve configured to supply the fuel to the reformer;
a reformed gas flow path through which the reformed gas generated by the reformer flows toward the engine;
a temperature detection unit configured to detect a temperature of the reformed gas flowing through the reformed gas flow path;
a rotation fluctuation detection unit configured to detect an amount of rotation fluctuation of the engine;
a deterioration detection unit configured to detect whether reforming performance of the catalyst of the reformer is deteriorated or not based on detection values of the temperature detection unit and the rotation fluctuation detection unit,
wherein when, in an idling period of the engine, the amount of rotation fluctuation of the engine is equal to or greater than a second threshold in a state where the temperature of the reformed gas is equal to or higher than a first threshold, the deterioration detection unit determines that the reforming performance of the catalyst is deteriorated;
a control unit configured to, when it is determined by the deterioration detection unit that the reforming performance of the catalyst is deteriorated, control the second flow rate control valve so that a flow rate of air supplied to the reformer increases; and
an in-exhaust oxygen detection unit configured to detect a concentration of oxygen contained in the exhaust gas flowing through the exhaust passage,
wherein the control unit determines whether or not the concentration of the oxygen detected by the in-exhaust oxygen detection unit is equal to or lower than a target value, and when the concentration of the oxygen is higher than the target value, controls the second fuel supply valve so that a flow rate of the fuel supplied to the reformer increases.

* * * * *